(12) United States Patent
Malladi et al.

(10) Patent No.: US 9,794,012 B2
(45) Date of Patent: Oct. 17, 2017

(54) CODING AND MULTIPLEXING OF CONTROL INFORMATION IN A WIRELESS COMMUNICATION SYSTEM

(71) Applicant: QUALCOMM Incorporated, San Diego, CA (US)

(72) Inventors: Durga Prasad Malladi, San Diego, CA (US); Byoung-Hoon Kim, Seoul (KR); Juan Montojo, Nuremberg (DE); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 777 days.

(21) Appl. No.: 13/958,019

(22) Filed: Aug. 2, 2013

(65) Prior Publication Data

US 2013/0315051 A1 Nov. 28, 2013

Related U.S. Application Data

(62) Division of application No. 12/190,461, filed on Aug. 12, 2008, now Pat. No. 8,503,375.

(Continued)

(51) Int. Cl.
*H04J 11/00* (2006.01)
*H04B 7/0417* (2017.01)
(Continued)

(52) U.S. Cl.
CPC ............ *H04J 11/00* (2013.01); *H04B 7/0417* (2013.01); *H04L 1/0028* (2013.01);
(Continued)

(58) Field of Classification Search
None
See application file for complete search history.

(56) References Cited

U.S. PATENT DOCUMENTS 6,285,663 B1  9/2001  Esmailzadeh
7,047,016 B2  5/2006  Walton et al.
(Continued)

FOREIGN PATENT DOCUMENTS

CN  101001136 A   7/2007
CN  101087169 A  12/2007
(Continued)

OTHER PUBLICATIONS

3GPP TS 36.211, "3rd Generation Partnership Project; Technical Specification Group Radio Access Network; Evolved Universal Terrestrial Radio Access (E-UTRA) Physical Channels and Modulation (Release 9)", (Mar. 2010), pp. 1-85, V9.1.0.

(Continued)

*Primary Examiner* — Huy D Vu
*Assistant Examiner* — Hong Shao
(74) *Attorney, Agent, or Firm* — Hyung G. Myung

(57) ABSTRACT

Techniques for sending control information in a wireless communication system are described. In an aspect, a UE spreads control information across frequency with a DFT and across time with an orthogonal sequence to obtain output data for the control information. In one design, the UE receives codewords for N HARQ processes in N downlink subframes, determines an ACK value for each HARQ process, codes N ACK values for the N HARQ processes to obtain ACK information, generates output data for the ACK information, and sends the output data in one of M uplink subframes. In another aspect, first control information is processed based on a first coding and multiplexing scheme utilizing code division multiplexing in time and frequency domains. Second control information is processed based on a second coding and multiplexing scheme utilizing code division multiplexing in time domain and spreading in frequency domain.

15 Claims, 13 Drawing Sheets

Related U.S. Application Data

(60) Provisional application No. 60/955,624, filed on Aug. 13, 2007.

(51) Int. Cl.
| | |
|---|---|
| *H04L 1/16* | (2006.01) |
| *H04L 1/00* | (2006.01) |
| *H04L 1/18* | (2006.01) |
| *H04L 5/00* | (2006.01) |

(52) U.S. Cl.
CPC .......... *H04L 1/0072* (2013.01); *H04L 1/1607* (2013.01); *H04L 1/1822* (2013.01); *H04L 5/0053* (2013.01); *H04L 5/0091* (2013.01); *H04L 1/0026* (2013.01); *H04L 1/0057* (2013.01); *H04L 1/1671* (2013.01); *H04L 1/1812* (2013.01); *H04L 5/0007* (2013.01); *H04L 5/0064* (2013.01)

(56) References Cited

U.S. PATENT DOCUMENTS

| | | | |
|---|---|---|---|
| 7,308,063 | B2 | 12/2007 | Priotti |
| 8,498,215 | B2 | 7/2013 | Walton et al. |
| 8,503,375 | B2 | 8/2013 | Malladi et al. |
| 2003/0053413 | A1 | 3/2003 | Sawahashi et al. |
| 2003/0235162 | A1 | 12/2003 | Chao et al. |
| 2004/0264507 | A1* | 12/2004 | Cho ........................ H04L 1/0001 370/480 |
| 2005/0068931 | A1* | 3/2005 | Cho ........................ H04L 27/261 370/345 |
| 2006/0126491 | A1* | 6/2006 | Ro ......................... H04L 27/2647 370/208 |
| 2006/0245472 | A1* | 11/2006 | Pan ......................... H04L 5/026 375/144 |
| 2006/0256761 | A1 | 11/2006 | Meylan et al. |
| 2006/0274710 | A1 | 12/2006 | Lim et al. |
| 2006/0274839 | A1 | 12/2006 | Fukuta et al. |
| 2007/0097887 | A1 | 5/2007 | Kim et al. |
| 2007/0165588 | A1 | 7/2007 | McCoy |
| 2007/0183386 | A1 | 8/2007 | Muharemovic et al. |
| 2008/0081651 | A1 | 4/2008 | Kuroda et al. |
| 2008/0095252 | A1* | 4/2008 | Kim ........................ H04L 1/1621 375/260 |
| 2009/0003274 | A1 | 1/2009 | Kwak et al. |
| 2009/0022135 | A1 | 1/2009 | Papasakellariou et al. |
| 2009/0046646 | A1 | 2/2009 | Cho et al. |
| 2009/0231993 | A1 | 9/2009 | Zhang et al. |
| 2009/0262856 | A1 | 10/2009 | Onggosanusi et al. |
| 2009/0268685 | A1 | 10/2009 | Chen et al. |
| 2010/0173641 | A1 | 7/2010 | Kim et al. |
| 2011/0142075 | A1 | 6/2011 | Che et al. |
| 2011/0158191 | A1 | 6/2011 | Zhang et al. |
| 2011/0164489 | A1 | 7/2011 | Papasakellariou et al. |
| 2011/0280203 | A1 | 11/2011 | Han et al. |
| 2012/0014320 | A1 | 1/2012 | Nam et al. |
| 2012/0106595 | A1 | 5/2012 | Bhattad et al. |
| 2012/0263124 | A1 | 10/2012 | Gaal et al. |
| 2012/0300728 | A1 | 11/2012 | Lee et al. |

FOREIGN PATENT DOCUMENTS

| | | |
|---|---|---|
| CN | 101127747 A | 2/2008 |
| CN | 101743704 A | 6/2010 |
| EP | 1585246 A2 | 10/2005 |
| EP | 1750387 A1 | 2/2007 |
| EP | 1764967 A2 | 3/2007 |
| EP | 1816666 A1 | 8/2007 |
| JP | 2003143654 A | 5/2003 |
| JP | 2007043715 A | 2/2007 |
| JP | 2007503138 A | 2/2007 |
| JP | 2007053815 A | 3/2007 |
| JP | 2010536230 A | 11/2010 |
| JP | 2012509002 A | 4/2012 |
| KR | 20060053671 A | 5/2006 |
| KR | 20060120737 A | 11/2006 |
| KR | 20070011171 A | 1/2007 |
| RU | 2221343 C2 | 1/2004 |
| RU | 2288538 C2 | 11/2006 |
| RU | 2303856 C2 | 7/2007 |
| TW | 200707956 | 2/2007 |
| WO | 2005015801 A2 | 2/2005 |
| WO | 2005020519 | 3/2005 |
| WO | WO-2006016457 A1 | 2/2006 |
| WO | WO-2006055646 A2 | 5/2006 |
| WO | WO-2006086359 A2 | 8/2006 |
| WO | WO-2006124419 A2 | 11/2006 |
| WO | 2007133411 | 11/2007 |
| WO | 2008153369 A1 | 12/2008 |
| WO | 2009022833 A2 | 2/2009 |
| WO | 2009156441 A2 | 12/2009 |
| WO | WO-2010056078 A2 | 5/2010 |

OTHER PUBLICATIONS

IP Wireless, "Precoding performance comparison for E-UTRA TDD [online]", 3GPP TSG-RAN WG1#48, R1-070977, pp. 6, <URL: http://www.3gpp.org/ftp/tsg_ran/WG1_RL1/TSGR1_48/Docs/R1-070977.zip>, Feb. 12, 2007.

QUALCOMM Europe, "Details on UL Antenna Switching [online]", 3GPP TSG-RAN WG1#50 R1-073272, pp. 1-5, <URL:http://www.3gpp.org/ftp/tsg_ran/WG1_RL1/TSGR1_50/Docs/R1-073272.zip>, Aug. 20, 2007.

CATT: "Non-codebook based pre-coding for E-UTRA TDD Downlink," 3GPP TSG RAN WG1 Meeting#46bis R1-062792, Oct. 4, 2006, 4 pages.

QUALCOMM Europe: "Multiplexing of Sounding RS and PUCCH", 3GPP TSG RAN1 WG1 Meeting#49-bis R1-072756, Jun. 20, 2007, 6 pages.

Samsung, "Discussion on Transmit Diversity for DFT-S-OFDM", 3GPP TSG-RAN WG1#62 R1-104617, Aug. 23, 2010, pp. 1-11.

Nokia: "CDM based Control Signal multiplexing w/ and w/o additional RS", 3GPP TSG-RAN WG1#47bis, R1-070395, Jan. 15, 2007, 5 Pages, URL: http://www.3gpp.org/ftp/tsg_ran/WG1_RL1/TSGR1_47bis/Docs/R1-070395.zip.

Nokia: "Data-non-associated control signal transmission without UL data", 3GPP TSG-RAN WG1#48, R1-070998, Feb. 12, 2007, 6 Pages, URL: http://www.3gpp.org/ftp/tsg_ran/WG1_RL1/TSGR1_48/Docs/R1-070998.zip.

Agilent Technologies: "Clarification of BLER for CQI under fading" 3GPP Draft; R4-051043, 3rd Generation Partnership Project (3GPP), Mobile Competence Centre ; 650, Route Des Lucioles ; F-06921 Sophia-Antipolis Cedex ; France, No. London, UK; 20050902, Sep. 2, 2005 (Sep. 2, 2005), XP050174611 p. 3, lines 3-5.

Catt, et al., "Clarifications of the dynamic beam-forming/pre-coding method in TDD mode and text proposal" 3GPP Draft; RI-060934, 3rd Generation Partnership Project (3GPP), Mobile Competence Centre ; 650, Route Des Lucioles ; F-06921 Sophia-Antipolis Cedex ; France, vol. RAN WG1, No. Athens, Greece; 20060327, Mar. 21, 2006 (Mar. 21, 2006), XP050101837 p. 5, penultimate paragraph.

Cho M., et al., "A Novel Time Spreading Method for Down-link OFDMCode Division Multiplexing Systems", IEEE Vehicular Technology Conference, VTC2004-Fall, vol. 3, Sep. 26, 2004, pp. 1845-1848, XP010786956.

Galda D., et al., "A Low Complexity Transmission Structure for OFDM-FDMA Uplink Systems", IEEE Vehicular Technology Conference, VTC2002-Spring, vol. 4, May 6, 2002, pp. 1737-1741, XP010622113.

Huawei: "Consideration on SRI transmission on PUCCH", 3GPP Draft; R1-081783, 3rd Generation Partnership Project (3GPP), Mobile Competence Centre ; 650, Route Des Lucioles ; F-06921 Sophia-Antipolis Cedex ; France, vol. RAN WG1, No. Kansas City, USA; 20080514, May 14, 2008 (May 14, 2008) , XP050110163, [retrieved on May 14, 2008].

(56) References Cited

OTHER PUBLICATIONS

International Search Report and the Written Opinion—PCT/US2008/073054, International Search Authority—European Patent Office—Jul. 20, 2009.
Motorola: "Multiplexing of UL L1/L2 control signals in the absence of data" 3GPP Draft; R1-072185 UL_CCH_NODATA, 3rd Generation Partnership Project (3GPP), Mobile Competence Centre ; 650, Route Des Lucioles ; F-06921 Sophia-Antipolis Cedex; France, vol. RAN WG1, No. Kobe, Japan; 20070507, May 2, 2007 (May 2, 2007), XP050105925 sections 2 and 3.
Motorola, R1-103931 "OCC and CS Configuration for Uplink DM-RS," 3GPP TSG RAN WG1 #61bis, Jun. 28-Jul. 3, 2010, Dresden, Germany, 5 pages.
Nakao S et al., "Performance Enhancement of E-UTRA uplink Control change in fast fading Environment", 2009 IEEE 69th Vehicular Technology conference.Apr. 26-29, 2009, Barcelona, Spain, I EEE, Piscataway, NJ, USA, Apr. 26, 2009 (Apr. 26, 2009) p. 1-5, XP031474732, ISBN: 978-1-4244-2517-4 the wholes document.
Nokia, et al., "Data-non-associated control signal transmission without UL data" 3GPP Draft; R1-071676, 3rd Generation Partnership Project (3GPP), Mobile Competence Centre ; 650, Route Des Lucioles ; F-06921 Sophia-Antipolis Cedex ; France, vol. RAN WG1, No. St. Julian; 20070326, Mar. 21, 2007 (Mar. 21, 2007), XP050105599 section 3 and 4.
Nokia Siemens Networks et al., "Remaining details related to PUCCH Format 3", 3GPP Draft; R1-105519, 3rd Generation Partnership Project (3GPP), Mobile Competence Centre ; 650, Route Des Lucioles ; F-06921 Sophia-Antipolis Cedex ; France, vol. RAN WG1, No. Xi 'an; 20101011, Oct. 5, 2010 (Oct. 5, 2010), XP050450632, [retrieved on Oct. 5, 2010].
Nokia Siemens Networks, Nokia,Multiplexing capability of CQIs and ACK/NACKs form different UEs[online],3GPP TSG-RAN WG1 Meeting49 R1-072315, <URL:http://www.3gpp.org/ftp/tsg_ran/WG1_RL1/TSGR1_49/Docs/R1-072315.zip>, May 2007.
"Non-codebook based Precoding in E-UTRA TDD" 3GPP Draft; R1-070201 Non-Codebook Based Precoding in E-UTRA TDD, 3rd Generation Partnership Project (3GPP), Mobile Competence Centre ; 650, Route Des Lucioles ; F- 06921 Sophia-Antipolis Cedex ; France, vol. RAN WG1, No. Sorrento, Italy; 20070115, Jan. 9, 2007 (Jan. 9, 2007), XP050104244 sections 2-4.
NTT DoCoMo, et al.: "Coding Scheme of L1/L2 Control Channel for E-UTRA Downlink" 3GPP TSG RAN WG1 LTE Ad Hoc, Cannes, France, Jun. 27-30, 2006, R1-061672, XP002436686.
Philips: "Reduction of HS-DPCCH power requirements" 36PP Draft; RI-02-1085, 3rd Generation Partnership Project (3GPP), Mobile Competence Centre ; 650, Route Des Lucioles ; F-06921 Sophia-Antipolis Cedex ; France, No. Seattle, USA; 20020819, Aug. 15, 2002 (Aug. 15, 2002), XP050096724 * section 2, lines 1-2 *.
Priyanto B. E. et al., "Initial Performance Evaluation of DFT-Spread OFDM Based SC-FDMA for UTRA LTE Uplink", IEEE VTC 2007 Spring, Apr. 22.
QUALCOMM Incorporated, 3GPP Draft: R1-105555 "Further details of PUCCH format 3," 3GPP TSG-RAN WG1 #62bis, Oct. 11-15, 2010, Xi'an, China, 10 pages.
Rani: "LS on status of Rel-7 FDD MIMO" 3GPP Draft; RI-063009, 3rd Generation Partnership Project (3GPP), Mobile Competence Centre ; 650, Route Des Lucioles ; F-06921 Sophia-Antipolis Cedex ; France, vol. RAN WG1, No. Seoul, Korea; 20061009, Oct. 13, 2006 (Oct. 13, 2006), XP050103465 p. 2, paragraph 2.
Sharp, R1-111145 "Clarification on OCC Application for UL DMRS," 3GPP TSG RAN WG1 #64, Feb. 21-25, 2011, Taipei, Taiwan, 5 pages.
Taiwan Search Report—TW097130810—TIPO—Jun. 15, 2012.
Texas Instruments: "Transmission of Downlink CQI in E-UTRA Uplink" 3GPP Draft; R1-072212-CQI, 3rd Generation Partnership Project (3GPP), Mobile Competence Centre ; 650, Route Des Lucioles ; F-06921 Sophia-Antipolis Cedex ; France, vol. RAN WG1, No. Kobe, Japan; 20070507, May 1, 2007 (May 1, 2007), XP050105948 section 2.
NTT DOCOMO, et al., "Coding Scheme of L1/L2 Control Channel for E-UTRA Downlink" 3GPP TSG RAN WG1 Meeting #47, Nov. 6-10, 2006, R1-063322.
Taiwan Search Report—TW102111334—TIPO—Feb. 12, 2015.
Huawei: "Slot-based Cyclic Shift and Orthogonal Cover Re-mapping for PUCCH", 3GPP TSG-RAN WG1 Meeting #52 (R1-081027), Sorrento, Italy, Feb. 11-15, 2008.
Samsung: "Selection of Orthogonal Cover and Cyclic Shift for High Speed UL ACK", 3GPP TSG RAN WG1 Meeting #50 (R1-073564), Athens, Greece, Aug. 20-24, 2007.
Samsung: "Slot-level UL ACK/NACK Cyclic Shift/Orthogonal Cover Remapping", 3GPP TSG RAN WG1 Meeting #52 (R1-080680), Sorrento, Italy, Feb. 11-15, 2008.
3GPP TS 36.300: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", Release 8, V8.1.0 (Jun. 2007), pp. 1-106.
Chunghwa Telecom Laboratories (CHTTL): "A Non-Codebook-based Precoding Scheme for TDD E-UTRA", 3GPP TSG-RAN WG1#46b, R1-062775, Oct. 2006, pp. 1-7, URL: http://www.3gpp.org/ftp/tsg_ran/WG1_RL1/TSGR1_46bis/Docs/R1-062775.zip.
Motorola: "E-UTRA Uplink L1/L2 Control Channel Mapping," 3GPP TSG RAN1 #47bis, R1-070162, Jan. 15-19, 2007, 5 pages.
Siemens AG: "HSDPA—Variable Channel Simulation Assumptions", 3GPP TSG-RAN WG4#25, R4-021563, Nov. 2002, pp. 1-4, URL: http://www.3gpp.org/ftp/tsg_ranANG4_Radio/TSGR4_25/Docs/R4-021563.zip.
European Search Report — EP10189193 — Search Authority — Munich — May 18, 2017.
European Search Report — EP1 01 891 95 — Search Authority — Munich — May 19, 2017.

* cited by examiner

CODING AND MULTIPLEXING OF CONTROL INFORMATION IN A WIRELESS COMMUNICATION SYSTEM

The present application is a divisional application of U.S. application Ser. No. 12/190,461, entitled CODING AND MULTIPLEXING OF CONTROL INFORMATION IN A WIRELESS COMMUNICATION SYSTEM, filed Aug. 12, 2008, assigned U.S. Pat. No. 8,503,375 with an issue date of Aug. 6, 2013, which claims priority to provisional U.S. Application Ser. No. 60/955,624, entitled METHOD AND APPARATUS FOR UPLINK CONTROL CHANNEL CODING AND MULTIPLEXING STRUCTURE FOR TDD SINGLE CARRIER SYSTEMS, filed Aug. 13, 2007, both assigned to the assignee hereof and incorporated herein by reference.

BACKGROUND

I. Field

The present disclosure relates generally to communication, and more specifically to techniques for sending control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may transmit traffic data to a user equipment (UE) on the downlink and/or receive traffic data from the UE on the uplink. The downlink (or forward link) refers to the communication link from the Node B to the UE, and the uplink (or reverse link) refers to the communication link from the UE to the Node B. The UE may send channel quality indicator (CQI) information indicative of the downlink channel quality to the Node B. The Node B may select a rate based on the CQI information and may send traffic data at the selected rate to the UE. The UE may send acknowledgement (ACK) information for traffic data received from the Node B. The Node B may determine whether to retransmit pending traffic data or to transmit new traffic data to the UE based on the ACK information. It is desirable to efficiently send ACK and CQI information.

SUMMARY

Techniques for sending control information in a wireless communication system are described herein. In an aspect, control information may be spread across frequency and also across time prior to transmission. In one design, a UE may encode control information (e.g., ACK and/or CQI information) based on a block code to obtain coded data. The UE may spread the coded data across frequency with a discrete Fourier transform (DFT) to obtain frequency spread data. The UE may further spread the frequency spread data across time with an orthogonal sequence to obtain output data for the control information. In one design, the UE may receive codewords for N hybrid automatic repeat request (HARQ) processes in N downlink subframes, where N>1. The UE may determine an ACK value for each HARQ process and may individually or jointly code N ACK values for the N HARQ processes to obtain ACK information. The UE may process the ACK information to obtain output data and may send the output data in one of M uplink subframes, where M>1. The N downlink subframes and the M uplink subframes may be time division duplexed.

In another aspect, first control information (e.g., ACK information for one HARQ process) may be processed based on a first coding and multiplexing scheme that utilizes code division multiplexing in both time domain and frequency domain. Second control information (e.g., ACK information for multiple HARQ processes, CQI information, or both ACK and CQI information) may be processed based on a second coding and multiplexing scheme that utilizes code division multiplexing in the time domain and spreading in the frequency domain.

In one design, a transmitter (e.g., a UE) may generate a modulation symbol based on the first control information, modulate a reference signal sequence with the modulation symbol, and spread the modulated reference signal sequence across time with a first orthogonal sequence. In one design, a receiver (e.g., a Node B) may despread received data across time with the first orthogonal sequence to obtain time despread data, correlate the time despread data with the reference signal sequence to obtain correlation results, and recover the first control information based on the correlation results.

In one design, the transmitter may encode the second control information to obtain coded data, spread the coded data across frequency with a DFT to obtain frequency spread data, and spread the frequency spread data across time with a second orthogonal sequence. In one design, the receiver may despread received data across time with the second orthogonal sequence to obtain time despread data, despread the time despread data across frequency with an inverse DFT (IDFT) to obtain frequency despread data, and decode the frequency despread data to recover the second control information.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
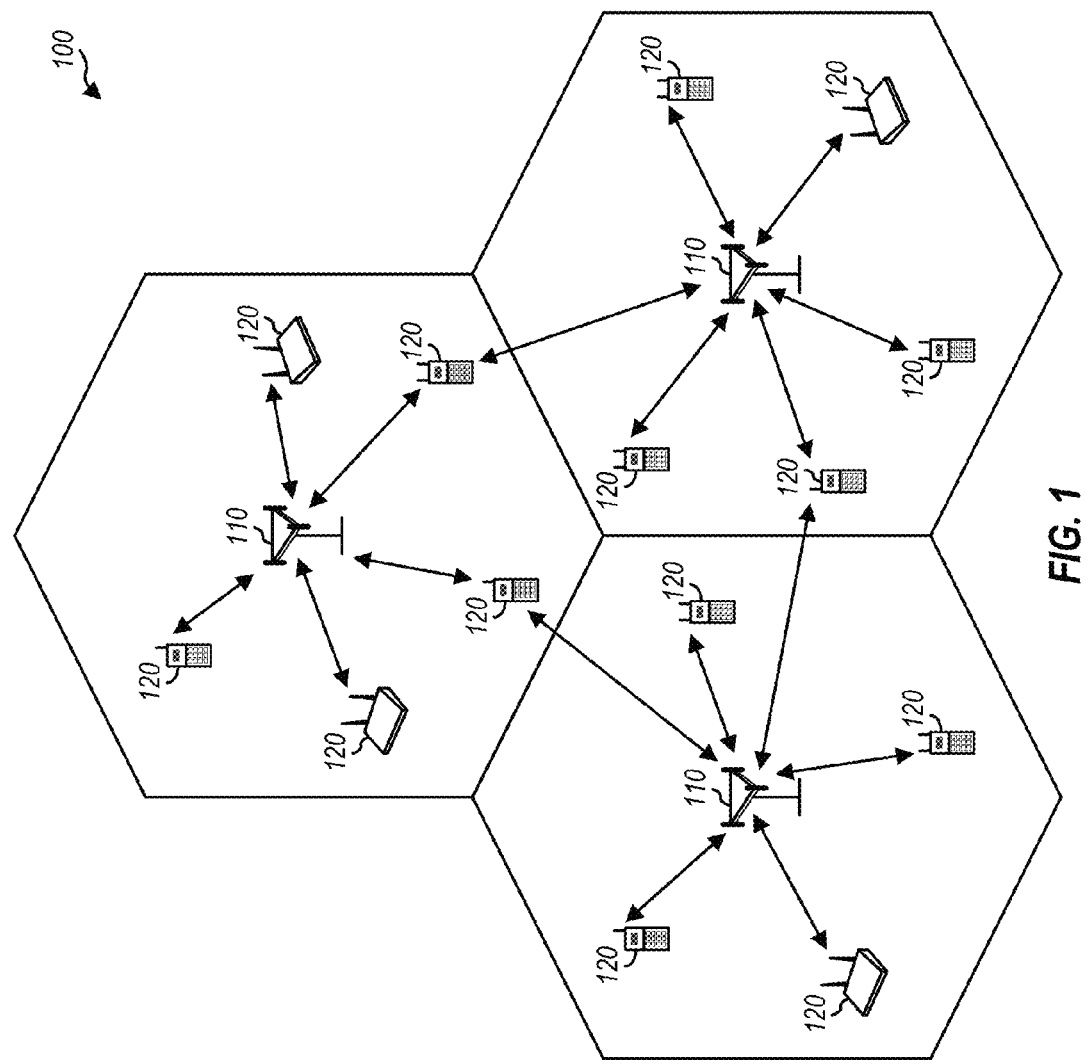
FIG. 1 shows a wireless communication system.

FIG. 1 shows a wireless communication system 100, which may be an LTE system. System 100 may include a number of Node Bs 110 and other network entities. A Node B may be a fixed station that communicates with the UEs and may also be referred to as an evolved Node B (eNB), a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc.

The system may utilize time division duplexing (TDD). For TDD, the downlink and uplink share the same frequency channel, which may be used for the downlink some of the time and for the uplink some other time.

Figure 2A:
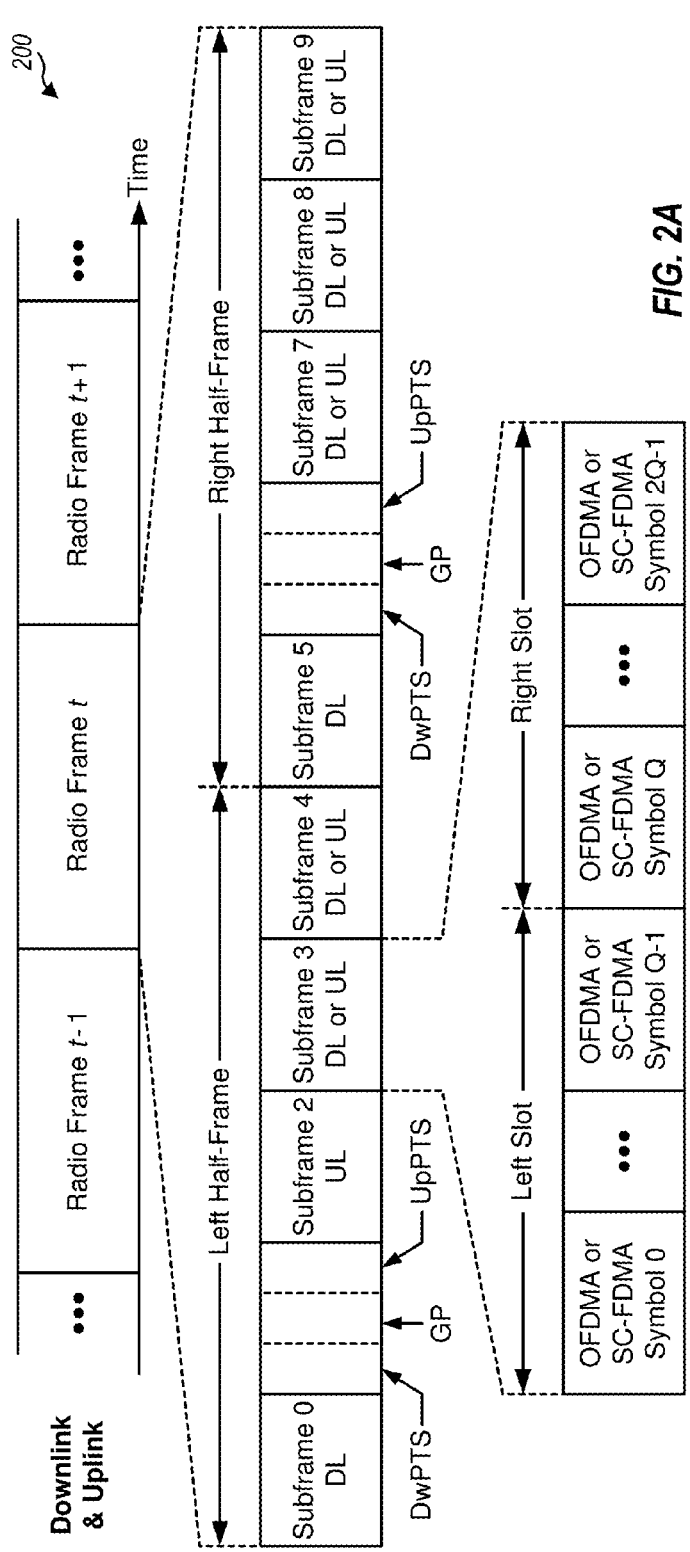
FIG. 2A shows an example frame structure for a TDD system.

FIG. 2A shows an example frame structure 200 that may be used for a TDD system. The transmission timeline may be partitioned into units of radio frames. Each radio frame may have a predetermined duration (e.g., 10 milliseconds (ms)) and may be partitioned into 10 subframes with indices of 0 through 9. LTE supports multiple downlink-uplink configurations. Subframes 0 and 5 may be used for the downlink (DL) and subframe 2 may be used for the uplink (UL) for all downlink-uplink configurations. Subframes 3, 4, 7, 8 and 9 may each be used for the downlink or uplink depending on the downlink-uplink configuration. Subframe 1 may include three special fields composed of a downlink pilot time slot (DwPTS), a guard period (GP), and an uplink pilot time slot (UpPTS). Subframe 6 may include only the DwPTS, or all three special fields, or a downlink subframe depending on the downlink-uplink configuration.

Each subframe that is not used for the special fields may be partitioned into two slots. Each slot may include Q symbol periods, e.g., Q=6 symbol periods for an extended cyclic prefix or Q=7 symbol periods for a normal cyclic prefix. Frame structure 200 is described in 3GPP TS 36.211, entitled "Evolved Universal Terrestrial Radio Access (E-UTRA); Physical Channels and Modulation," which is publicly available.

Figure 2B:
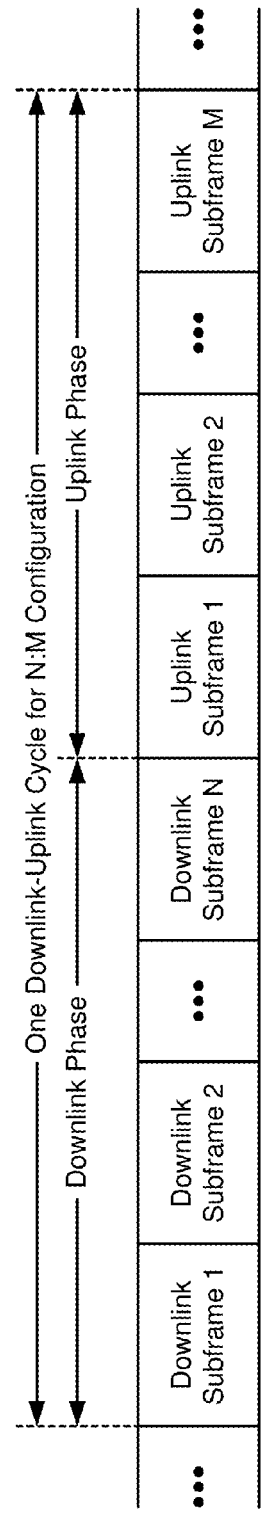
FIG. 2B shows an N:M configuration for the TDD system.

FIG. 2B shows an N:M configuration for the downlink and uplink in the TDD system. For the N:M configuration, a downlink-uplink cycle includes N downlink subframes 1 through N followed by M uplink subframes 1 through M. In general, N≥1, M≥1, and N may or may not be equal to M. Asymmetry in the downlink and uplink exists when N is not equal to M. Subframes with special fields are not shown in FIG. 2B for simplicity. The downlink-uplink cycle may be static or semi-static.

The following system configurations may be supported:
  1:M configuration—one downlink subframe is followed by M uplink subframes, where M≥1.
  N:M configuration—N downlink subframes are followed by M uplink subframes, where N>1 and M≥1.

A UE may operate in a discontinuous reception (DRX) mode in which the UE does not receive P1 downlink subframes in each downlink-uplink cycle. The UE may then effectively operate in an (N-P1):M configuration. Alternatively, the UE may operate in a discontinuous transmission (DTX) mode in which the UE does not transmit on P2 uplink subframes in each downlink-uplink cycle. The UE may then effectively operate in an N:(M-P2) configuration. The UE may also operate in both the DRX and DTX modes in which the UE does not receive P1 downlink subframes and does not transmit on P2 uplink subframes in each downlink-uplink cycle. The UE may then effectively operate in an (N-P1):(M-P2) configuration. In any case, the configuration of the UE may affect how control information will be sent by the UE, as described below.

The system may support HARQ. For HARQ on the downlink, a Node B may send a transmission for a codeword to a UE and may send one or more additional transmissions until the codeword is decoded correctly by the UE, or the maximum number of transmissions has been sent, or some other termination condition is encountered. HARQ may improve reliability of data transmission.

Figure 3:
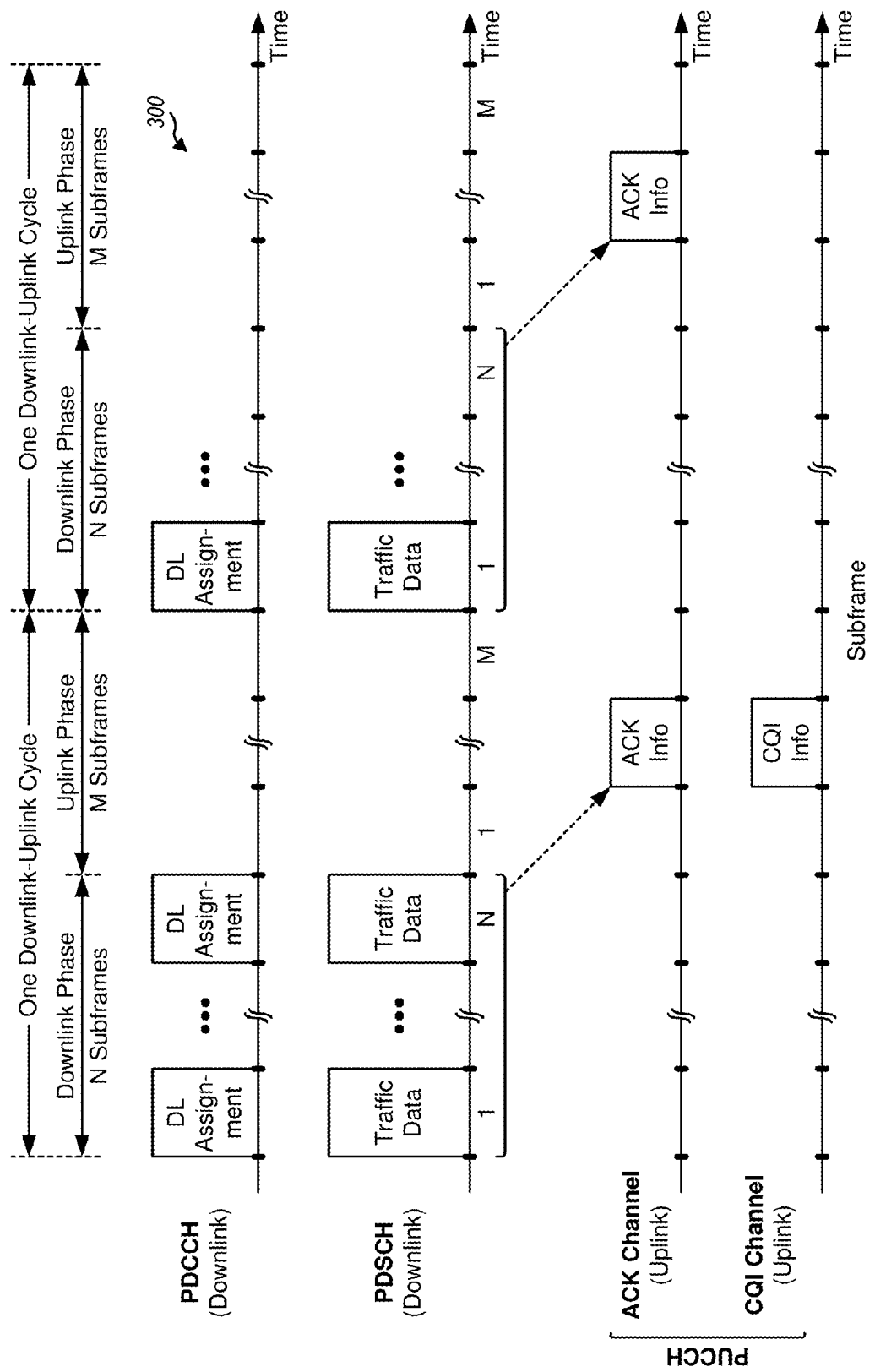
FIG. 3 shows example transmissions on the downlink and uplink.

FIG. 3 shows example downlink transmissions by a Node B and example uplink transmissions by a UE in the TDD system. The UE may periodically estimate the downlink channel quality for the Node B and may send CQI information on a CQI channel to the Node B. The Node B may use the CQI information and/or other information to schedule the UE for downlink transmission and to select a suitable rate (e.g., a modulation and coding scheme) for the UE. For each downlink subframe in which the UE is scheduled, the Node B may process $N_B$ transport blocks (or packets) to obtain $N_B$ codewords, one codeword for each transport block, where $N_B \geq 1$. The Node B may send the $N_B$ codewords on a physical downlink shared channel (PDSCH) and may send a corresponding downlink assignment on a physical downlink control channel (PDCCH) to the UE. The Node B may send no downlink assignment and no codeword to the UE in each downlink subframe in which the UE is not scheduled.

The UE may process the PDCCH in each downlink subframe to obtain a downlink assignment, if any, sent to the UE. If a downlink assignment is received, then the UE may process the PDSCH and decode the $N_B$ codewords sent to the UE. The UE may generate ACK information for all codewords received by the UE in the N downlink subframes of a downlink phase. The ACK information may comprise an ACK or a NAK for each codeword, where the ACK may indicate that the codeword is decoded correctly and the NAK may indicate that the codeword is decoded in error. The UE may send the ACK information on an ACK channel in an assigned uplink subframe in the next uplink phase. The ACK and CQI channels may be part of a physical uplink control channel (PUCCH). The Node B may resend each codeword for which a NAK is received and may send a new codeword for each codeword for which an ACK is received.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 4:
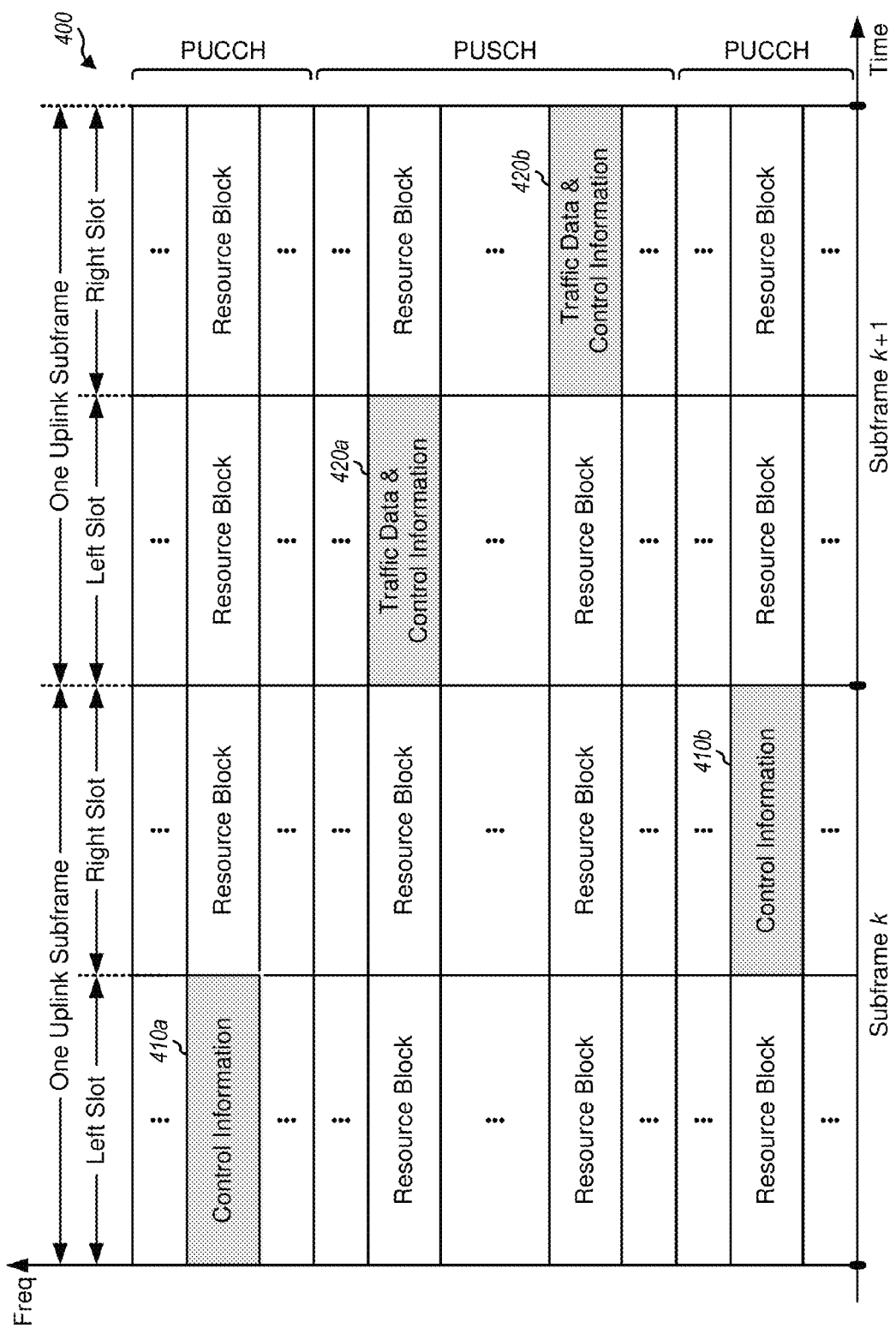
FIG. 4 shows a transmission structure for the uplink.

FIG. 4 shows a design of a transmission structure 400 that may be used for the uplink. The K total subcarriers may be grouped into resource blocks. Each resource block may include S subcarriers (e.g., S=12 subcarriers) in one slot. The available resource blocks may be assigned to the PUCCH and a physical uplink shared channel (PUSCH). The PUCCH may include resource blocks near the two edges of the system bandwidth, and PUSCH may include all resource blocks not assigned to the PUCCH. A UE may be assigned resource blocks for the PUCCH to transmit control information to a Node B. The UE may also be assigned resource blocks for the PUSCH to transmit only traffic data or both traffic data and control information to the Node B.

A UE may send various types of control information on the uplink to a Node B. Table 1 lists some types of control information that may be sent by the UE in accordance with one design.

TABLE 1

| Control Information | # of Bits | Description |
|---|---|---|
| ACK information | $N_{ACK}$ | Convey ACK or NAK for each codeword received from a Node B. |
| CQI information | $N_{CQI}$ | Convey downlink channel quality for the Node B. |
| Scheduling request | $N_{SR}$ | Convey request for uplink resources. |

The number of bits ($N_{ACK}$) to send for ACK information may be dependent on various factors such as the number of HARQ processes to acknowledge, the number of codewords sent in each HARQ process, whether to acknowledge a downlink assignment, etc. In one design, the Node B may send traffic data on up to N HARQ processes to the UE, one HARQ process in each downlink subframe. In one design, the Node B may send one codeword in each HARQ process to the UE with single-input multiple-output (SIMO) or spatial division multiple access (SDMA). In one design, the Node B may send two codewords in each HARQ process to the UE with single-user multiple-input multiple-output (SU-MIMO). For these designs, the Node B may send one or two codewords in each HARQ process, and the UE may receive zero to 2N codewords in N downlink subframes in one downlink phase. The UE may generate ACK information for all codewords and may send the ACK information in an uplink subframe in the next uplink phase. The ACK information may be generated in various manners.

In a first ACK design, the ACK information may comprise an ACK or a NAK for each codeword. An ACK value for a codeword may be set to one of two possible values, as follows:
  0=ACK→the codeword was decoded correctly, and
  1=NAK→the codeword was decoded in error.

For the first ACK design, one bit may be used for each HARQ process with one codeword, and two bits may be used for each HARQ process with two codewords. The ACK information may comprise (i) up to N bits if one codeword is sent in each HARQ process or (ii) up to 2N bits if two codewords are sent in each HARQ process.

In a second ACK design, the ACK information may comprise an ACK or a NAK for each codeword as well as an indication of whether a downlink assignment was received by the UE. For each HARQ process, the UE may send a DTX value if a downlink assignment for that HARQ process was not received by the UE. If a downlink assignment was received, then the UE may send either an ACK or a NAK for each codeword sent in the HARQ process. This ACK design may avoid ambiguity when sending ACK information for multiple HARQ processes.

For the second ACK design, an ACK value for an HARQ process with one codeword may be set to one of three possible values, as follows:
  0=DTX→the UE missed the PDCCH and did not receive a downlink assignment,
  1=ACK→the codeword was decoded correctly, and
  2=NAK→the codeword was decoded in error.

For the second ACK design, an ACK value for an HARQ process with two codewords may be set to one of five possible values, as follows:
  0=DTX→the UE missed the PDCCH and did not receive a downlink assignment,
  1=ACK, ACK→both codewords were decoded correctly,
  2=ACK, NAK→only the first codeword was decoded correctly,
  3=NAK, ACK→only the second codeword was decoded correctly, and
  4=NAK, NAK→both codewords were decoded in error.

In one design, the ACK value for each HARQ process may be coded individually. For the second ACK design, two bits may be used for each HARQ process with one codeword, and three bits may be used for each HARQ process with two codewords. In another design, the ACK values for all HARQ processes may be coded jointly. For the second ACK design, the number of bits to send for ACK information for N HARQ processes may be expressed as:

$$N_{ACK} = \lceil \log_2(3^N) \rceil \text{ for } N \text{ HARQ processes with one codeword, and} \quad \text{Eq (1a)}$$

$$N_{ACK} = \lceil \log_2(5^N) \rceil \text{ for } N \text{ HARQ processes with two codewords,} \quad \text{Eq (1b)}$$

where ⌈ ⌉ denotes a ceiling operator.

Joint coding of the ACK values for all HARQ processes may reduce the number of bits to send for the ACK information while conveying all of the information. As an example, for N=5 HARQ processes with one codeword (or two codewords), the ACK information may comprise either 10 bits (or 15 bits) for individual coding or 8 bits (or 12 bits) for joint coding. Joint coding may provide a scalable structure for dealing with extreme asymmetry between the downlink and uplink and may improve coding gain when the number of ACK information bits increases.

In general, the ACK information may comprise any number of bits for any number of codewords sent in any number of HARQ processes. In much of the following description, the ACK information comprises $N_{ACK}$ bits that may be obtained by individually or jointly coding the ACK values for all HARQ processes.

The number of bits ($N_{CQI}$) to send for CQI information may be dependent on various factors such as the CQI reporting format, the number of codewords to send in each HARQ process, the desired resolution for each CQI value, etc. In one design, the CQI information may comprise a CQI value for each codeword, which may be used to select a modulation and coding scheme for that codeword. In another design, the CQI information may comprise (i) a base CQI value that is equal to the CQI value of the first codeword and (ii) a delta CQI value that is equal to the difference between the CQI values of the first and second codewords. The CQI information may also comprise other information. The CQI information may include $N_{CQI}$=8 bits or some other number of bits.

The number of bits ($N_{SR}$) to send for a scheduling request may be dependent on the request format, the type of information to send for the request, the desired resolution, etc. For example, the scheduling request may convey the amount of data to send by the UE, the amount of resources being requested, etc. For simplicity, much of the description below assumes that a scheduling request is not sent, so that $N_{SR}$=0.

In general, a UE may send any control information in a given uplink subframe to a Node B. For simplicity, much of the description below covers transmission of only ACK information, or only CQI information, or both ACK and CQI information on the PUCCH.

A UE may send control information (e.g., ACK and/or CQI information) in various manners. The control information from multiple UEs may also be multiplexed in various manners. Table 2 summarizes three coding and multiplexing schemes that may be used to send control information. In Table 2, TD-FD-CDM denotes code division multiplexing (CDM) in both time domain (TD) and frequency domain (FD). FD-CDM denotes code division multiplexing in the frequency domain. TD-CDM denotes code division multiplexing in the time domain. Each coding and multiplexing scheme is described in further detail below.

TABLE 2

|  | Scheme 1 | Scheme 2 | Scheme 3 |
| --- | --- | --- | --- |
| Signaling basis | Modulated reference signal sequence (RSS) | Modulated reference signal sequence | DFT spread |
| Multiplexing | TD-FD-CDM | FD-CDM | TD-CDM |

Figure 5:
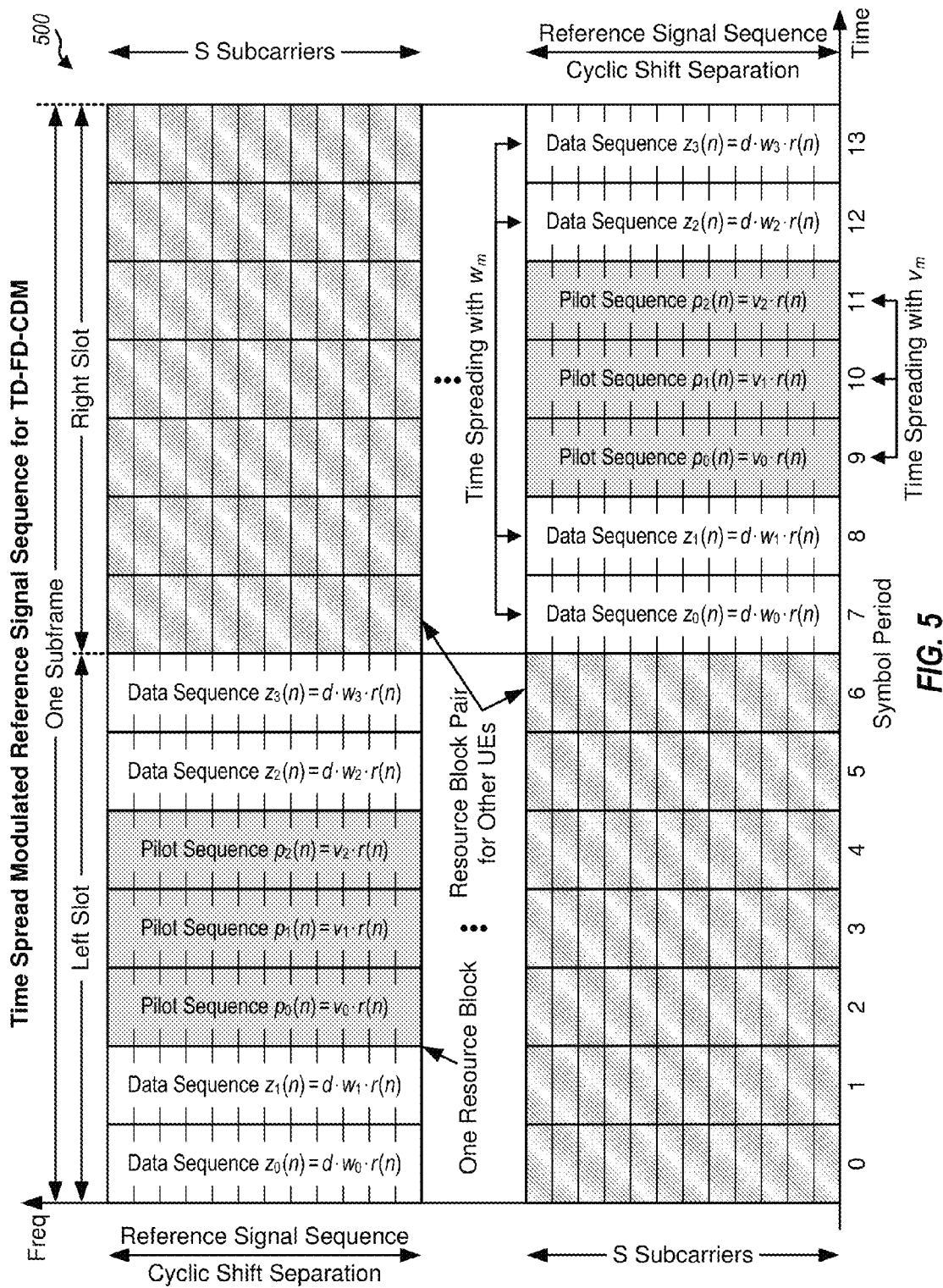
FIG. 5 shows an example structure for coding and multiplexing scheme 1.

FIG. 5 shows an example structure 500 for coding and multiplexing scheme 1. For the normal cyclic prefix, each slot includes seven symbol periods, the left slot includes symbol periods 0 through 6, and the right slot includes symbol periods 7 through 13. One or more UEs may simultaneously send control information on a resource block pair that includes either (i) one resource block in the top half of the left slot and one resource block in the bottom half of the right slot, as shown in FIG. 5, or (ii) one resource block in the bottom half of the left slot and one resource block in the top half in the right slot (shown with diagonal hashing in FIG. 5).

In the design shown in FIG. 5, each resource block includes four symbol periods for control data and three symbol periods for pilot. Control data is sent in symbol periods 0, 1, 5 and 6 and pilot is sent in symbol periods 2, 3 and 4 of each resource block.

A UE may send control data and pilot using a reference signal sequence having good correlation properties. Different UEs may simultaneously send control data and pilot on the same resource block using different reference signal sequences, which may be generated with a base sequence $r_b(n)$. The base sequence may be a CAZAC (constant amplitude zero auto correlation) sequence such as a Zadoff-Chu (ZC) sequence, a sequence with unit magnitude and pseudo-random phases, etc.

A reference signal sequence r(n) for a UE may be obtained by cyclically shifting the base sequence $r_b(n)$, as follows:

$$r(n) = e^{j\alpha \cdot n} \cdot r_b(n), \quad \text{Eq (2)}$$

where α is a cyclic shift assigned to the UE.

The UE may generate one modulation symbol d for control information, e.g., ACK information. The UE may modulate its reference signal sequence r(n) with the modulation symbol d to obtain a modulated reference signal sequence d·r(n). The UE may then spread the modulated reference signal sequence with an orthogonal sequence $w_m$ to obtain data sequences $z_m(n)$, as follow:

$$z_m(n) = d \cdot w_m \cdot r(n), \quad \text{Eq (3)}$$

where n is a frequency index and m is a time index.

The UE may obtain four data sequences $z_0(n)$, $z_1(n)$, $z_2(n)$ and $z_3(n)$ by spreading the modulated reference signal sequence with four symbols $w_0$, $w_1$, $w_2$ and $w_3$, respectively, of the orthogonal sequence $w_m$. The UE may send data sequences $z_0(n)$, $z_1(n)$, $z_2(n)$ and $z_3(n)$ in symbol periods 0, 1, 5 and 6, respectively, in the left slot and in symbol periods 7, 8, 12 and 13, respectively, in the right slot, as shown in FIG. 5.

The UE may also spread its reference signal sequence r(n) with an orthogonal sequence $v_m$ to obtain pilot sequences $p_m(n)$, as follow:

$$p_m(n) = v_m \cdot r(n). \quad \text{Eq (4)}$$

The UE may obtain three pilot sequences $p_0(n)$, $p_1(n)$ and $p_2(n)$ by spreading the reference signal sequence with three symbols $v_0$, $v_1$ and $v_2$, respectively, of the orthogonal sequence $v_m$. The UE may send pilot sequences $p_0(n)$, $p_1(n)$ and $p_2(n)$ in symbol periods 2, 3 and 4, respectively, in the left slot and in symbol periods 9, 10 and 11, respectively, in the right slot, as shown in FIG. 5.

The orthogonal sequences may also be referred to as orthogonal codes, Walsh codes, spreading codes, etc. L orthogonal sequences of length L may be obtained from L columns of an L×L DFT matrix, where L may be any integer value. If L is a power of two, then L Walsh sequences of length L may be used for L orthogonal sequences.

For the extended cyclic prefix, each slot includes six symbol periods, the left slot includes symbol periods 0 through 5, and the right slot includes symbol periods 6 through 11. Each resource block may include four symbol periods 0, 1, 4 and 5 for control data and two symbol periods 2 and 3 for pilot.

Different UEs may be assigned different reference signal sequences generated with different cyclic shifts of the same base sequence $r_b(n)$. These reference signal sequences would be orthogonal to one another due to the CAZAC properties and may be sent simultaneously on the same set of subcarriers in one symbol period to achieve FD-CDM. The number of cyclic shifts may be dependent on the channel delay spread. More cyclic shifts may be supported for shorter channel delay spread, and vice versa.

Different UEs may also be assigned the same reference signal sequence but different orthogonal sequences. Each UE may spread its reference signal sequence with the orthogonal sequence assigned to that UE. The spread reference signal sequences for these UEs may be sent simultaneously across symbol periods in the same resource block to achieve TD-CDM. The number of orthogonal sequences is determined by (e.g., equal to) the length of these sequences, which may in turn be dependent on the channel Doppler spread. Shorter orthogonal sequences may be used for high Doppler spread, and vice versa.

The number of UEs that can simultaneously send their control data on the same resource block may be determined by the number of cyclic shifts as well as the number of orthogonal sequences for control data. Similarly, the number of UEs that can simultaneously send their pilots on the same resource block may be determined by the number of cyclic shifts as well as the number of orthogonal sequences for pilot. Each UE may send control data as well as pilot, as shown in FIG. 5. The number of UEs that can be multiplexed in the same resource block may be determined by the smaller of (i) the number of UEs that can simultaneously send their control data and (ii) the number of UEs that can simultaneously send their pilots.

Figure 6:
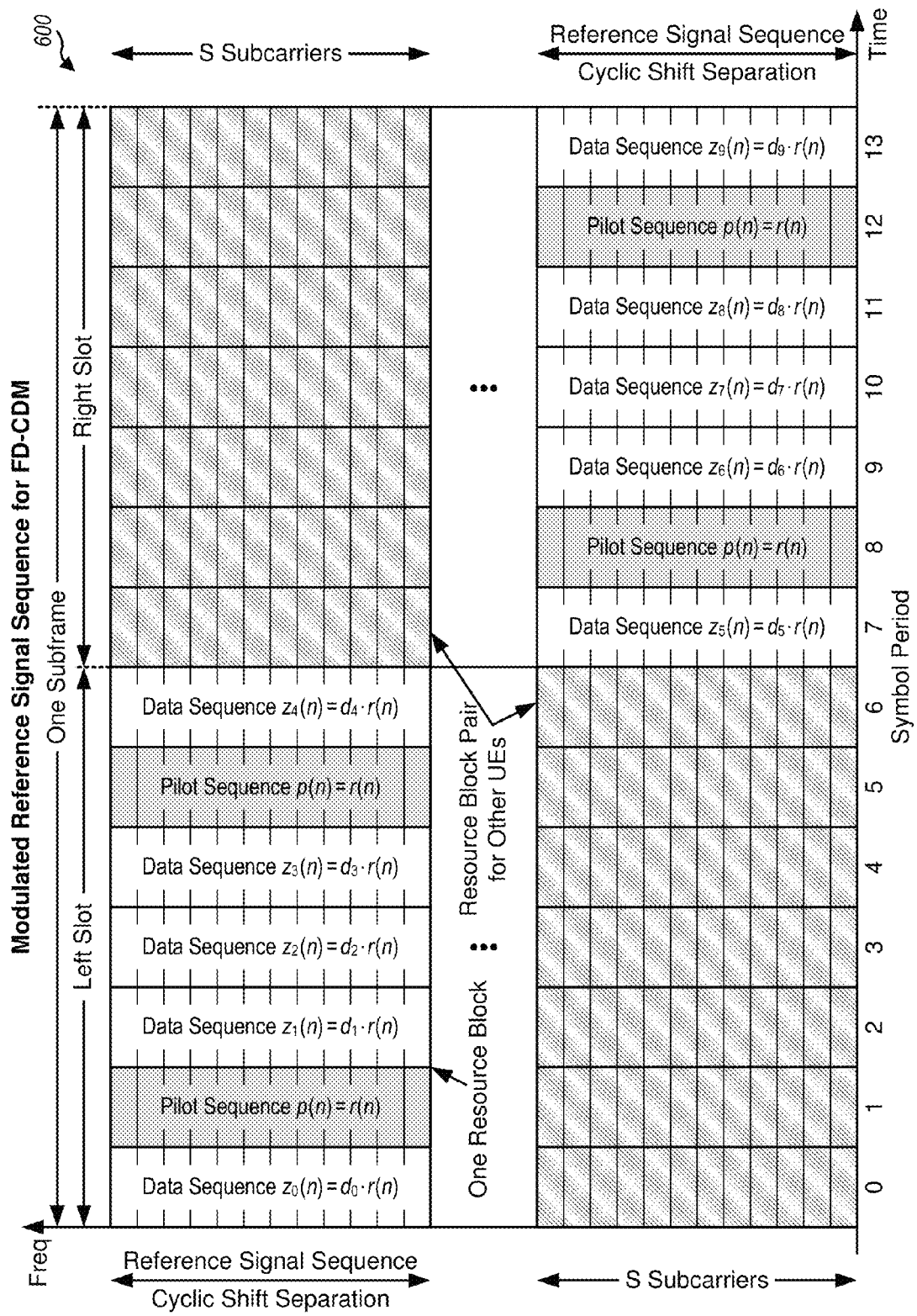
FIG. 6 shows an example structure for coding and multiplexing scheme 2.

FIG. 6 shows an example structure 600 for coding and multiplexing scheme 2. In the design shown in FIG. 6, each resource block includes five symbol periods for control data and two symbol periods for pilot. Pilot is sent in symbol periods 1 and 5 of each resource block, and control data is sent in the remaining five symbol periods.

A UE may process control information (e.g., only CQI information or both ACK and CQI information) and generate ten modulation symbols $d_0$ through $d_9$. The UE may modulate its reference signal sequence $r(n)$ with the ten modulation symbols to obtain ten data sequences $z_m(n)$, as follow:

$$z_m(n)=d_m \cdot r(n). \qquad \text{Eq (5)}$$

The UE may send data sequences $z_0(n)$, $z_1(n)$, $z_2(n)$, $z_3(n)$ and $z_4(n)$ in symbol periods 0, 2, 3, 4 and 6, respectively, in the left slot. The UE may send data sequences $z_5(n)$, $z_6(n)$, $z_7(n)$, $z_8(n)$ and $z_9(n)$ in symbol periods 7, 9, 10, 11 and 13, respectively, in the right slot, as shown in FIG. 6. The UE may use the reference signal sequence $r(n)$ as a pilot sequence $p(n)$. The UE may send the pilot sequence in symbol periods 1 and 5 in the left slot and in symbol periods 8 and 12 in the right slot, as shown in FIG. 6.

Different UEs may be assigned different reference signal sequences generated with different cyclic shifts of the same base sequence $r_b(n)$. Each UE may modulate its reference signal sequence with its modulation symbols for control data and may send its reference signal sequence as pilot. The number of UEs that can simultaneously send their control information in the same resource block pair may be determined by the number of cyclic shifts. For example, up to six UEs may be multiplexed on the same resource block pair with six cyclic shifts.

Figure 7:
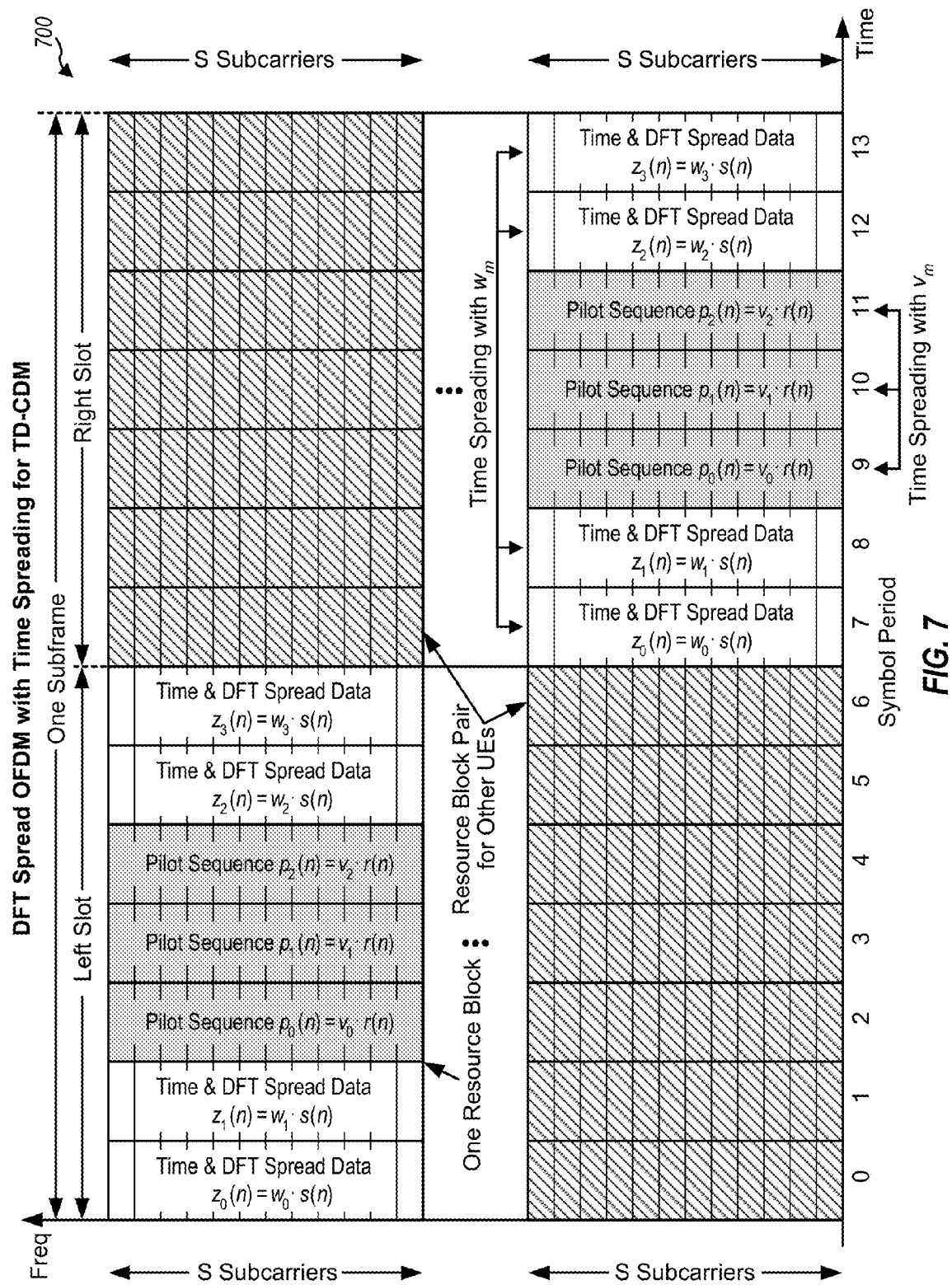
FIG. 7 shows an example structure for coding and multiplexing scheme 3.

FIG. 7 shows an example structure 700 for coding and multiplexing scheme 3. In the design shown in FIG. 7, each resource block includes four symbol periods for control data and three symbol periods for pilot. Control data is sent in symbol periods 0, 1, 5 and 6 and pilot is sent in symbol periods 2, 3 and 4 of each resource block.

A UE may process control information (e.g., ACK and/or CQI information) and generate up to S modulation symbols $d_i$. The UE may spread the modulation symbols $d_i$ across frequency with an S-point DFT to obtain S frequency-domain symbols $s(n)$, as follows:

$$s(n)=\text{DFT}\{d_i\}, \qquad \text{Eq (6)}$$

where i is a time index, n is a frequency index, and DFT { } denotes a DFT function.

The UE may spread the set of S frequency-domain symbols with an orthogonal sequence $w_m$ to obtain data sequences $z_m(n)$, as follow:

$$z_m(n)=w_m \cdot s(n). \qquad \text{Eq (7)}$$

In one design, the UE may obtain four data sequences $z_0(n)$, $z_1(n)$, $z_2(n)$ and $z_3(n)$ by spreading the set of S frequency-domain symbols with four symbols $w_0$, $w_1$, $w_2$ and $w_3$, respectively, of the orthogonal sequence $w_m$. The UE may send data sequences $z_0(n)$, $z_1(n)$, $z_2(n)$ and $z_3(n)$ in symbol periods 0, 1, 5 and 6, respectively, in the left slot. In one design, the UE may also send the four data sequences $z_0(n)$, $z_1(n)$, $z_2(n)$ and $z_3(n)$ in symbol periods 7, 8, 12 and 13, respectively, in the right slot, as shown in FIG. 7. In another design, the UE may generate four additional data sequences $z_4(n)$, $z_5(n)$, $z_6(n)$ and $z_7(n)$ with additional control information and may send these data sequences in symbol periods 7, 8, 12 and 13, respectively.

The UE may also spread its reference signal sequence with an orthogonal sequence $v_m$ to obtain pilot sequences, as shown in equation (4). The UE may send its pilot sequences in symbol periods 2, 3 and 4 in the left slot and in symbol periods 9, 10 and 11 in the right slot, as shown in FIG. 7.

Different UEs may be assigned different orthogonal sequences for control data and pilot. Each UE may spread its DFT spread data across time with its orthogonal sequence for control data. Each UE may also spread its reference signal sequence across time with its orthogonal sequence for pilot. The number of UEs that can simultaneously send their control information in the same resource block pair may be determined by the number of orthogonal sequences for control data and the number of orthogonal sequences for pilot.

Coding and multiplexing scheme 1 may be used to send a small amount of control information, e.g., 1 or 2 bits of ACK information for one HARQ process. As shown in FIG. 5, one modulation symbol may be sent in one resource block pair by modulating a reference signal sequence with the modulation symbol and spreading the modulated reference signal sequence across time with an orthogonal sequence.

Coding and multiplexing scheme 2 may be used to send a moderate amount of control information, e.g., approximately 20 bits of CQI information or both ACK and CQI information. As shown in FIG. 6, ten modulation symbols may be sent in one resource block pair by modulating a reference signal sequence with these modulation symbols.

Coding and multiplexing scheme 3 may be used to send a moderate to large amount of control information, e.g., 20 or more bits of ACK and/or CQI information. As shown in FIG. 7, the control information may be spread across frequency with a DFT and further spread across time with an orthogonal sequence.

Different coding and multiplexing schemes may be used for different system configurations and different control information. Table 3 gives the coding and multiplexing schemes for six scenarios A through F in accordance with one design. Each scenario corresponds to a particular system configuration (1:M or N:M) and one or more types of control information to send.

TABLE 3

| System Configuration | Parameter | Only ACK Information | Only CQI Information | ACK and CQI Information |
|---|---|---|---|---|
| 1:M Configuration | Scenario | Scenario A | Scenario C | Scenario E |
| | ACK Coding Scheme | Individual Scheme 1 | — | Joint Scheme 3 |
| | Signaling | Modulated RSS | DFT spread | DFT spread |
| | Multiplexing | TD-FD-CDM | TD-CDM | TD-CDM |
| N:M Configuration (N > 1) | Scenario | Scenario B | Scenario D | Scenario F |
| | ACK Coding Scheme | Joint Scheme 3 | — | Joint Scheme 3 |
| | Signaling | DFT spread | DFT spread | DFT spread |
| | Multiplexing | TD-CDM | TD-CDM | TD-CDM |

For scenario A, coding and multiplexing scheme 1 may be used to send only ACK information in the 1:M configuration. In scenario A, a UE may send 1 or 2 bits of ACK information for one HARQ process. Coding and multiplexing scheme 1 may allow more UEs to be multiplexed in the same resource block pair.

In one design, for the normal cyclic prefix, each resource block may include four data symbols and three pilot symbols and may have a format of DDPPPDD, where "D" denotes a data symbol and "P" denotes a pilot symbol, as shown in FIG. 5. In one design, up to 18 UEs may be multiplexed in typical urban (TU) channel and low Doppler with the following:
  6 cyclic shifts for FD-CDM,
  3 orthogonal codes of length 4 for data in symbols (0, 1, 5, 6) for TD-CDM, and
  3 orthogonal codes of length 3 for pilot in symbols (2, 3, 4) for TD-CDM.

In one design, for the normal cyclic prefix, up to 12 UEs may be multiplexed in TU channel and high Doppler with the following:
  6 cyclic shifts for FD-CDM,
  2 orthogonal codes of length 2 for data in symbols (0, 1) and symbols (5, 6), and
  2 orthogonal codes of length 3 for pilot in symbols (2, 3, 4).

In one design, for the extended cyclic prefix, each resource block may include four data symbols and two pilot symbols and may have a format of DDPDD. In one design, up to eight UEs may be multiplexed in vehicle-B channel and low or high Doppler with the following:
  4 cyclic shifts for FD-CDM, and
  2 orthogonal codes of length 2 for data in symbols (0, 1) and symbols (4, 5) and also for pilot in symbols (2, 3) for TD-CDM.

Table 4 lists various parameter values for sending only ACK information with coding and multiplexing scheme 1 for scenario A.

TABLE 4

Coding and Multiplexing Scheme 1

| | | Normal Cyclic Prefix | | Extended Cyclic Prefix |
|---|---|---|---|---|
| Parameter | | Low Doppler | High Doppler | |
| Resource Block Format | | DDPPPDD | DDPPPDD | DDPDD |
| Number of UEs | $N_{UE}$ | 18 | 12 | 8 |
| Number cyclic shifts | $N_S$ | 6 | 6 | 4 |
| Number of data orthogonal codes | $N_D$ | 3 | 2 | 2 |
| Length of data orthogonal codes | $N_{DL}$ | 4 | 2 | 2 |
| Number of pilot orthogonal codes | $N_P$ | 3 | 2 | 2 |
| Length of pilot orthogonal codes | $N_{PL}$ | 3 | 3 | 2 |

For scenario B, coding and multiplexing scheme 3 may be used to send only ACK information in the N:M configuration. In scenario B, a UE may send $N_{ACK}$ bits of ACK information for up to N HARQ processes, where $N_{ACK}$ may be given as shown in equation (1a) or (1b) for joint coding. Coding and multiplexing scheme 3 may allow the UE to send ACK information for more HARQ processes in one resource block pair.

For scenarios C through F, coding and multiplexing scheme 3 may be used to send only CQI information or both ACK and CQI information. For these scenarios, a UE may send $N_{CQI}$ bits of CQI information and up to $N_{ACK}$ bits of ACK information for up to N HARQ processes. Coding and multiplexing scheme 3 may allow the UE to send all of the control information in one resource block pair for each of scenarios C through F. In an alternative design, coding and multiplexing scheme 2 may be used for scenarios C and D, and coding and multiplexing scheme 3 may be used for scenarios E and F. A UE would then need to support all three coding and multiplexing schemes 1, 2 and 3 for all six scenarios. The design in Table 3 may allow a UE to support only coding and multiplexing schemes 1 and 3 for all six scenarios.

In one design, for the normal cyclic prefix, each resource block may include four data symbols and three pilot symbols and may have a format of DDPPPDD. In one design, up to three UEs may be multiplexed in low Doppler with the following:
  3 orthogonal codes of length 4 for data in symbols (0, 1, 5, 6) for TD-CDM, and
  3 orthogonal codes of length 3 for pilot in symbols (2, 3, 4) for TD-CDM.

In one design, for the normal cyclic prefix, up to two UEs may be multiplexed in high Doppler with the following:
  2 orthogonal codes of length 2 for data in symbols (0, 1) and symbols (5, 6), and
  2 orthogonal codes of length 3 for pilot in symbols (2, 3, 4).

In one design, for the extended cyclic prefix, each resource block may include four data symbols and two pilot symbols and may have a format of DDPPDD. In one design, up to two UEs may be multiplexed in low or high Doppler with the following:
  2 orthogonal codes of length 2 for data in symbols (0, 1) and symbols (4, 5) and also for pilot in symbols (2, 3).

Table 5 lists various parameter values for sending only CQI information or both ACK and CQI information with coding and multiplexing scheme 3 for scenarios B through F.

TABLE 5

Coding and Multiplexing Scheme 3

| | | Normal Cyclic Prefix | | Extended |
| --- | --- | --- | --- | --- |
| Parameter | | Low Doppler | High Doppler | Cyclic Prefix |
| Resource Block Format | | DDPPPDD | DDPPPDD | DDPPDD |
| Number of UEs | $N_{UE}$ | 3 | 2 | 2 |
| Number of data orthogonal codes | $N_D$ | 3 | 2 | 2 |
| Length of data orthogonal codes | $N_{DL}$ | 4 | 2 | 2 |
| Number of pilot orthogonal codes | $N_P$ | 3 | 2 | 2 |
| Length of pilot orthogonal codes | $N_{PL}$ | 3 | 3 | 2 |

In another design, for the normal cyclic prefix, each resource block may include five data symbols and two pilot symbols and may have a format of DPDDDPD, as shown in FIG. 6. In one design, up to two UEs may be multiplexed in low Doppler with the following:
  2 orthogonal codes of length 5 for data in symbols (0, 2, 3, 4, 6), and
  2 orthogonal codes of length 2 for pilot in symbols (1, 5).

In another design, for the extended cyclic prefix, each resource block may include five data symbols and one pilot symbol and may have a format of DDDPDD. In one design, one UE may be multiplexed in low Doppler with the following:
  1 orthogonal code of length 5 for data in symbols (0, 1, 2, 4, 5).

In yet another design, for the normal cyclic prefix, each resource block may include seven data symbols and no pilot symbols and may have a format of DDDDDDD. In one design, up to seven UEs may be multiplexed in low Doppler with the following:
  7 orthogonal codes of length 7 for data in symbols (0, 1, 2, 3, 4, 5, 6).

For the extended cyclic prefix, each resource block may include six data symbols and no pilot symbols and may have a format of DDDDDD. In one design, up to six UEs may be multiplexed in low Doppler with the following:
  6 orthogonal codes of length 6 for data in symbols (0, 1, 2, 3, 4, 5).

For coding and multiplexing scheme 3 in scenarios B through F in Table 3, the number of UEs that can simultaneously transmit pilot in one resource block pair may be increased by using different cyclic shifts. The number of UEs that can simultaneously transmit control data in one resource block pair may be increased by using more orthogonal sequences.

In another design, for the normal cyclic prefix with resource block format DDPPPDD, up to four UEs may be multiplexed in low Doppler with the following:
  4 orthogonal codes of length 4 for data in symbols (0, 1, 5, 6), and
  2 cyclic shifts and 2 orthogonal codes of length 3 for pilot in symbols (2, 3, 4).

In one design, for the normal cyclic prefix, up to four UEs may be multiplexed in high Doppler with the following:
  2 orthogonal codes of length 2 for data in symbols (0, 1) for two UEs,
  2 orthogonal codes of length 2 for data in symbols (5, 6) for two other UEs, and
  2 cyclic shifts and 2 orthogonal codes of length 3 for pilot in symbols (2, 3, 4).

In one design, for the extended cyclic prefix with resource block format DDPPDD, up to four UEs may be multiplexed in low or high Doppler with the following:
  2 orthogonal codes of length 2 for data in symbols (0, 1) for two UEs,
  2 orthogonal codes of length 2 for data in symbols (4, 5) for two other UEs, and
  2 cyclic shifts and 2 orthogonal codes of length 2 for pilot in symbols (2, 3).

In general, each resource block may include any number of data symbols and any number of pilot symbols and may have any format. Example designs for coding and multiplexing schemes 1 and 3 for some resource block formats have been described above. Coding and multiplexing schemes 1 and 3 may also be implemented with other designs for other resource block formats.

A UE may be able to send more control information with coding and multiplexing scheme 3. As an example, for the normal cyclic prefix with low Doppler in Table 5, the UE may encode 12 ACK information bits to obtain 24 code bits and may map these code bits to 12 modulation symbols. The UE may perform a 12-point DFT on the 12 modulation symbols to obtain 12 frequency-domain symbols. The UE may then spread these 12 frequency-domain symbols across four symbol periods with an orthogonal sequence of length 4. The UE may be able to send more ACK information bits by using a shorter orthogonal sequence. For example, the UE may send 12 modulation symbols in symbol periods 0 and 1 with an orthogonal sequence of length 2 and may send another 12 modulation symbols in symbol periods 5 and 6 with the same orthogonal sequence.

The designs shown in Tables 4 and 5 allow for multiplexing of UEs using coding and multiplexing scheme 3 with UEs using coding and multiplexing scheme 1 on the same resource block. These UEs may be separated based on their orthogonal sequences. For a given resource block, any number of orthogonal sequences may be assigned to UEs using coding and multiplexing scheme 3, and the remaining orthogonal sequences may be assigned to UEs using coding and multiplexing scheme 1.

For most of the designs described above, more UEs with low Doppler may be multiplexed on one resource block with more orthogonal sequences of longer length. Conversely, fewer UEs with high Doppler may be multiplexed on one resource block with fewer orthogonal sequences of shorter length. In one design, low Doppler UEs and high Doppler UEs may be multiplexed in the same resource block by using orthogonal sequences of shorter length. In another design, low Doppler UEs and high Doppler UEs may be multiplexed by using orthogonal sequences of different lengths. As an example, for a given resource block, one high Doppler UE may be assigned orthogonal sequence '00', and three low Doppler UEs may be assigned orthogonal sequences '0101', '0011' and '0110'.

For a TDD system, the downlink and uplink share the same frequency channel, and a downlink channel response may be correlated with an uplink channel response. MIMO transmission on the downlink may be supported in several manners in the TDD system.

In a first design, a UE may estimate a downlink MIMO channel as well as downlink noise and interference for a Node B, e.g., based on a cell-specific reference signal received from the Node B. The UE may select a precoding matrix and the number of codewords to send based on the downlink MIMO channel estimate and the noise and interference estimate. The UE may determine a signal-to-noise ratio (SNR) for each codeword based on the selected precoding matrix, the downlink MIMO channel estimate, and the noise and interference estimate. The UE may convert the SNR for each codeword to a CQI value based on a predetermined mapping. The UE may repeat the processing for each subband of interest. The UE may send feedback information comprising precoding matrix indicator (PMI) information and CQI information for each subband of interest. The Node B may transmit traffic data to the UE based on the feedback information received from the UE.

In a second design, the UE may periodically send a sounding reference signal but not CQI information to the Node B. The Node B may estimate an uplink MIMO channel as well as uplink noise and interference for the UE based on the sounding reference signal. The Node B may assume that the downlink MIMO channel matches the uplink MIMO channel due to channel reciprocity in the TDD system. The Node B may also assume that the downlink noise and interference at the UE matches the uplink noise and interference at the Node B. The Node B may select a precoding matrix and the number of codewords to send based on the uplink MIMO channel estimate and the uplink noise and interference estimate. The Node B may also determine the SNR for each codeword based on the selected precoding matrix, the uplink MIMO channel estimate, and the uplink noise and interference estimate. The Node B may then transmit traffic data to the UE based on the precoding matrix and the SNR for each codeword. This design may reduce feedback overhead and may also reduce the effective CQI loop delay.

In a third design, the UE may periodically send a sounding reference signal and CQI information to the Node B. The UE may estimate SNR without precoding and may send CQI information for the non-precoded SNR. The Node B may estimate an uplink MIMO channel as well as uplink noise and interference for the UE based on the sounding reference signal. The Node B may assume that the downlink MIMO channel matches the uplink MIMO channel due to channel reciprocity in the TDD system. The Node B may determine the asymmetry in the downlink noise and interference and the uplink noise and interference based on the SNR reported by the UE and the uplink noise and interference estimate obtained by the Node B. The Node B may then estimate the downlink noise and interference for the UE based on the uplink noise and interference estimate and the downlink/uplink asymmetry. The Node B may select a precoding matrix and the number of codewords to send based on the uplink MIMO channel estimate and the downlink noise and interference estimate. The Node B may also determine the SNR for each codeword based on the selected precoding matrix, the uplink MIMO channel estimate, and the downlink noise and interference estimate. The Node B may then transmit traffic data to the UE based on the precoding matrix and the SNR for each codeword.

Figure 8:
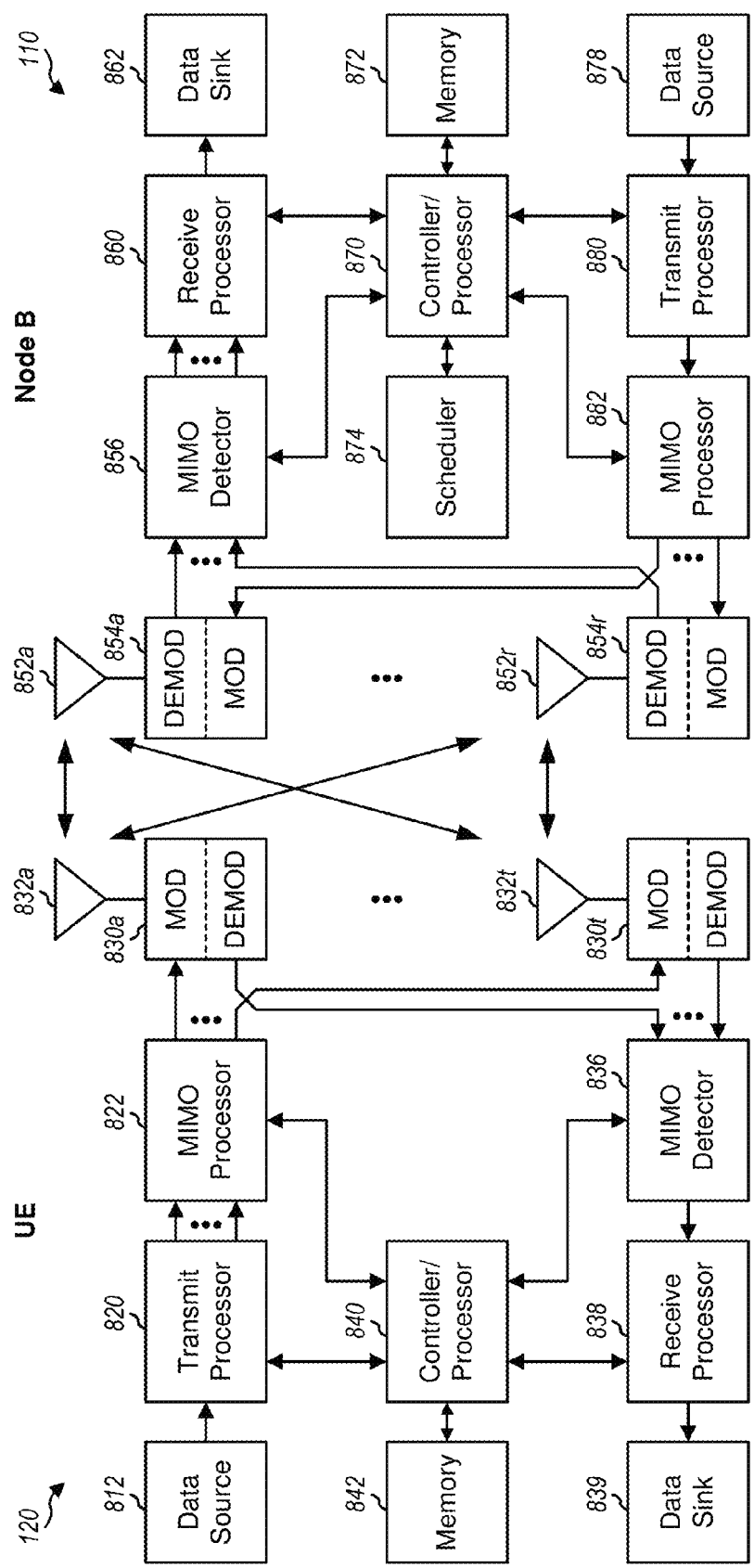
FIG. 8 shows a block diagram of a Node B and a UE.

FIG. 8 shows a block diagram of a design of a Node B 110 and a UE 120, which may be one of the Node Bs and one of the UEs in FIG. 1. In this design, UE 120 is equipped with T antennas 832a through 832t, and Node B 110 is equipped with R antennas 852a through 852r, where in general T≥1 and R≥1.

At UE 120, a transmit processor 820 may receive traffic data from a data source 812, process (e.g., encode and symbol map) the traffic data, and provide data symbols. Transmit processor 820 may also receive control information (e.g., ACK and/or CQI information) from a controller/processor 840, process the control information, and provide control symbols. Transmit processor 820 may also generate pilot symbols (e.g., for pilot sequences) and may multiplex the pilot symbols with the data symbols and the control symbols. A MIMO processor 822 may process (e.g., precode) the symbols from transmit processor 820 and provide T output symbol streams to T modulators (MOD) 830a through 830t. Each modulator 830 may process its output symbol stream (e.g., for SC-FDM) to obtain an output sample stream. Each modulator 830 may further condition (e.g., convert to analog, filter, amplify, and upconvert) its output sample stream to generate an uplink signal. T uplink signals from modulators 830a through 830t may be transmitted via T antennas 832a through 832t, respectively.

At Node B 110, antennas 852a through 852r may receive the uplink signals from UE 120 and/or other UEs. Each antenna 852 may provide a received signal to an associated demodulator (DEMOD) 854. Each demodulator 854 may condition (e.g., filter, amplify, downconvert, and digitize) its received signal to obtain samples and may further process the samples (e.g., for SC-FDM) to obtain received symbols. A MIMO detector 856 may perform MIMO detection on the received symbols from all R demodulators 854a through 854r and provide detected symbols. A receive processor 860 may process (e.g., demodulate and decode) the detected symbols, provide decoded traffic data to a data sink 862, and provide decoded control information to a controller/processor 870.

Node B 110 may transmit traffic data, control information, and reference signals on the downlink to UE 120 and/or other UEs. Traffic data from a data source 878 and/or control information from controller/processor 870 may be processed by a transmit processor 880 and precoded by a MIMO processor 882 to obtain R output symbol streams. R modulators 854a through 854r may process the R output symbol streams (e.g., for OFDM) to obtain R output sample streams and may further condition the output sample streams to obtain R downlink signals, which may be transmitted via R antennas 852a through 852r. At UE 120, the downlink signals from Node B 110 may be received by antennas 832a through 832t, conditioned and processed by demodulators 830a through 830t, and further processed by a MIMO detector 836 (if applicable) and a receive processor 838 to recover the traffic data and control information sent to UE 120. Receive processor 838 may provide decoded traffic data to a data sink 839 and provide decoded control information to controller/processor 840.

Controllers/processors 840 and 870 may direct the operation at UE 120 and Node B 110, respectively. Memories 842 and 872 may store data and program codes for UE 120 and Node B 110, respectively. A scheduler 874 may schedule UEs for data transmission on the downlink and/or uplink and may assign resources to the scheduled UEs. Scheduler 874 may also assign resources to the UEs for transmission of control information. The resources may comprise resource blocks, orthogonal sequences for control data, orthogonal sequences for pilot, reference signal sequences, etc.

Figure 9:
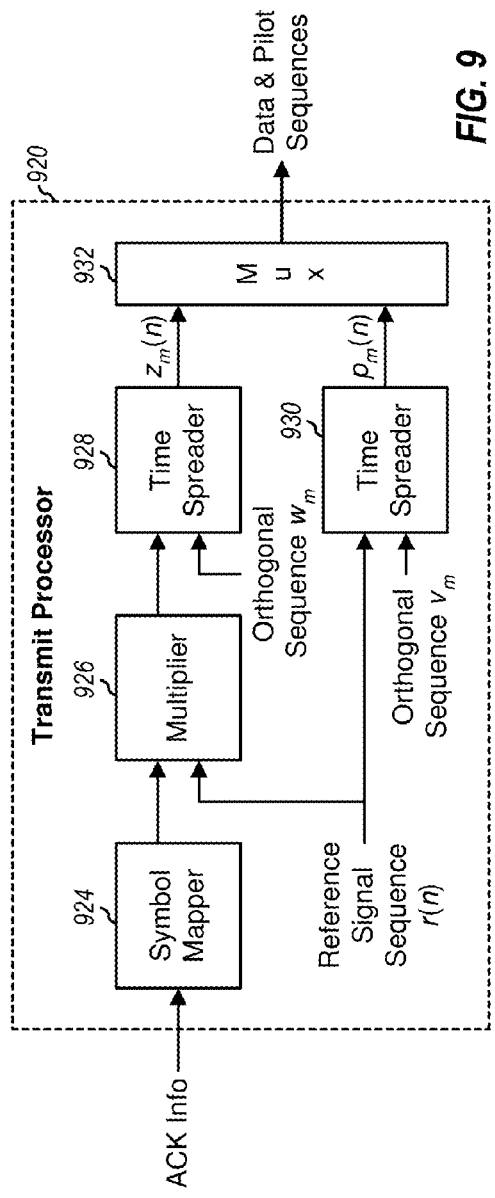
FIG. 9 shows a transmit processor for coding and multiplexing scheme 1.

FIG. 9 shows a block diagram of a design of a transmit processor 920 for coding and multiplexing scheme 1. Transmit processor 920 may be part of transmit processor 820 at UE 120 in FIG. 8. Within transmit processor 920, a symbol mapper 924 may map ACK information to a modulation symbol. A multiplier 926 may multiply a reference signal sequence r(n) with the modulation symbol and provide a modulated reference signal sequence. A time spreader 928 may spread the modulated reference signal sequence with an orthogonal sequence $w_m$ for control data and provide data sequences $z_m(n)$, e.g., as shown in equation (3). A time spreader 930 may spread the reference signal sequence with an orthogonal sequence $v_m$ for pilot and provide pilot sequences $p_m(n)$, e.g., as shown in equation (4). A multiplexer (Mux) 932 may receive the data sequences from spreader 928 and the pilot sequences from spreader 930 and may provide each sequence in a proper symbol period, e.g., as shown in FIG. 5.

Figure 10:
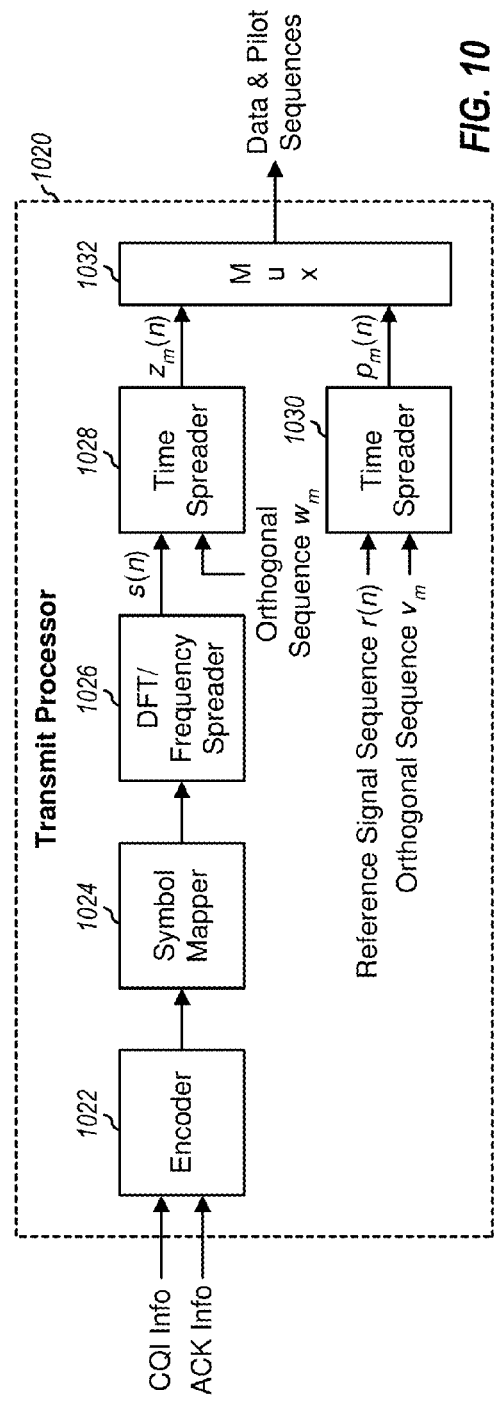
FIG. 10 shows a transmit processor for coding and multiplexing scheme 3.

FIG. 10 shows a block diagram of a design of a transmit processor 1020 for coding and multiplexing scheme 3. Transmit processor 1020 may also be part of transmit processor 820 at UE 120 in FIG. 8. Within transmit processor 1020, an encoder 1022 may encode only CQI information or jointly encode both CQI and ACK information based on a block code to obtain code bits. A symbol mapper 1024 may map the code bits to modulation symbols. A DFT/frequency spreader 1026 may transform the modulation symbols with an S-point DFT to obtain S frequency-domain symbols $s(n)$. A time spreader 1028 may spread the S frequency-domain symbols with an orthogonal sequence $w_m$ for control data and provide data sequences $z_m(n)$, e.g., as shown in equation (7). A time spreader 1030 may spread the reference signal sequence with an orthogonal sequence $v_m$ for pilot and provide pilot sequences $p_m(n)$. A multiplexer 1032 may receive the data sequences from spreader 1028 and the pilot sequences from spreader 1030 and may provide each sequence in a proper symbol period, e.g., as shown in FIG. 7.

FIGS. 9 and 10 show example designs of the processing by UE 120 for coding and multiplexing schemes 1 and 3, respectively. UE 120 may also perform processing for coding and multiplexing schemes 1 and 3 in other manners.

Figure 11:
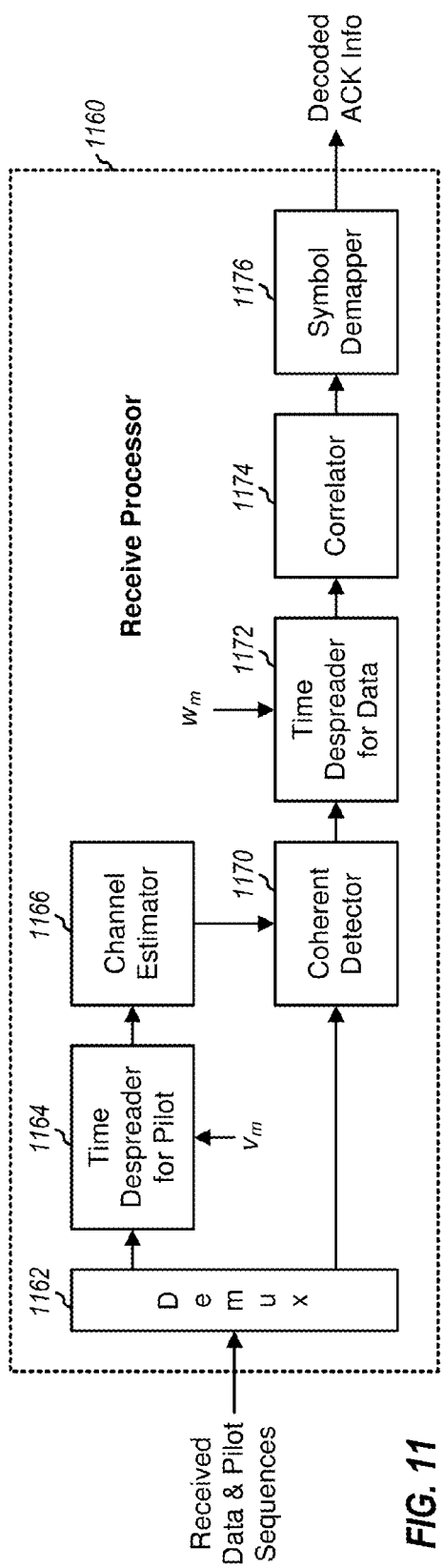
FIG. 11 shows a receive processor for coding and multiplexing scheme 1.

FIG. 11 shows a block diagram of a design of a receive processor 1160 for coding and multiplexing scheme 1. Receive processor 1160 may be part of receive processor 860 at Node B 110 in FIG. 8. Within receive processor 1160, a demultiplexer (Demux) 1162 may obtain received data and pilot sequences for ACK information from a resource block pair assigned to UE 120, provide the received pilot sequences to a time despreader 1164, and provide the received data sequences to a coherent detector 1170. Time despreader 1164 may despread the received pilot sequences for each resource block with the orthogonal sequence $v_m$ assigned to UE 120 and provide a despread pilot sequence for that resource block. A channel estimator 1166 may derive a channel estimate for the S subcarriers in each resource block based on the despread pilot sequence for that resource block. Coherent detector 1170 may perform coherent detection for each received data sequence with an applicable channel estimate and provide a corresponding detected data sequence. A time despreader 1172 may despread the detected data sequences for each resource block with the orthogonal sequence $w_m$ assigned to UE 120 and provide a despread data sequence for that resource block. A correlator 1174 may correlate the despread data sequence for each resource block with each of the possible reference signal sequences and may provide correlation result for the best reference signal sequence. A symbol demapper 1176 may obtain correlation results for the two resource blocks, determine the modulation symbol most likely to have been sent by UE 120 based on the correlation results, and provide decoded ACK information for the UE.

Figure 12:
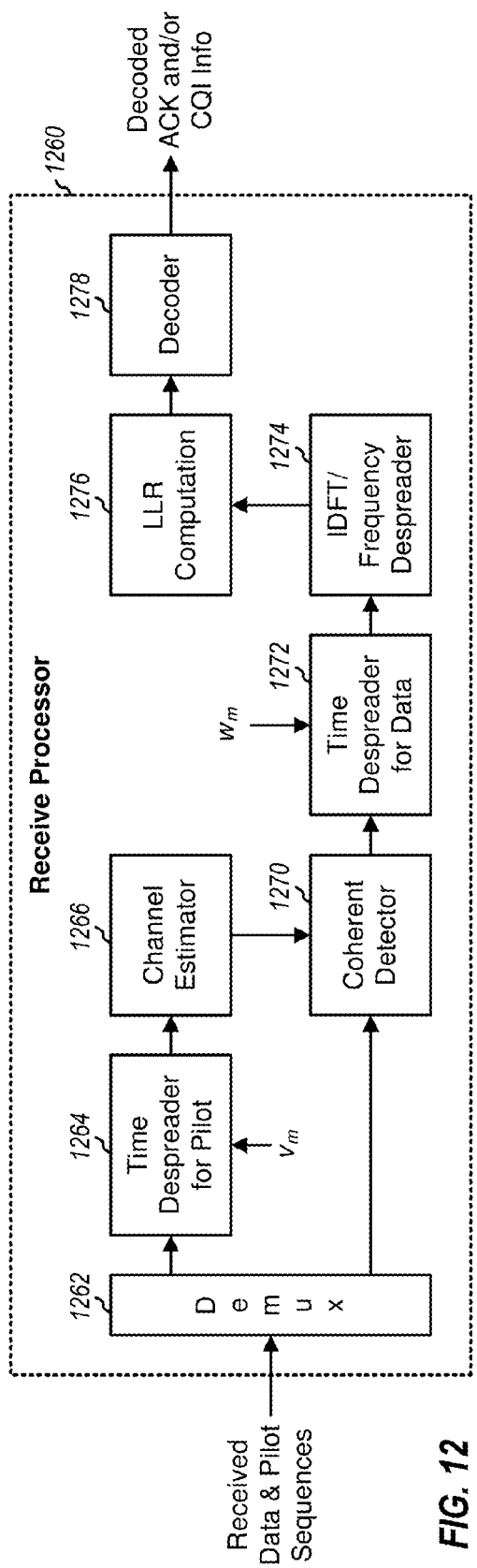
FIG. 12 shows a receive processor for coding and multiplexing scheme 3.

FIG. 12 shows a block diagram of a design of a receive processor 1260 for coding and multiplexing scheme 3. Receive processor 1260 may also be part of receive processor 860 at Node B 110 in FIG. 8. Within receive processor 1260, a demultiplexer 1262 may obtain received data and pilot sequences for ACK and/or CQI information from a resource block pair assigned to UE 120, provide the received pilot sequences to a time despreader 1264, and provide the received data sequences to a coherent detector 1270. Time despreader 1264 may despread the received pilot sequences for each resource block. A channel estimator 1266 may derive a channel estimate for the S subcarriers in each resource block. Coherent detector 1270 may perform coherent detection for each received data sequence with an applicable channel estimate and provide a corresponding detected data sequence. A time despreader 1272 may despread the detected data sequences for each resource block and provide a despread data sequence for that resource block. An IDFT/frequency despreader 1274 may perform an IDFT on the despread data sequence for each resource block and provide despread symbols for that resource block. A unit 1276 may compute log-likelihood ratios (LLRs) for code bits based on the despread symbols. A decoder 1278 may decode the LLRs and provide decoded ACK and/or CQI information for UE 120.

FIGS. 11 and 12 show example designs of the processing by Node B 110 for coding and multiplexing schemes 1 and 3, respectively. Node B 110 may also perform processing for coding and multiplexing schemes 1 and 3 in other manners.

Figure 13:
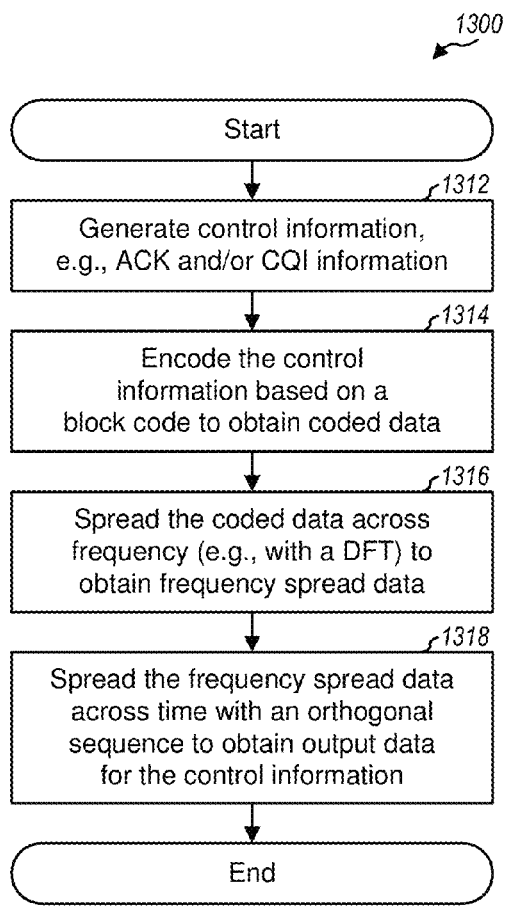
FIG. 13 shows a process for sending control information.

FIG. 13 shows a design of a process 1300 for sending control information in a wireless communication system. Process 1300 may be performed by a UE (as described below) or by some other entity. The UE may generate control information comprising ACK information, CQI information, scheduling request information, some other control information, or a combination thereof (block 1312). The UE may encode the control information (e.g., jointly encode ACK and CQI information) based on a block code to obtain coded data (block 1314). The UE may spread the coded data across frequency with a DFT to obtain frequency spread data (block 1316). The UE may further spread the frequency spread data across time with an orthogonal sequence to obtain output data for the control information (block 1318). In one design of block 1316, the UE may spread the coded data across S subcarriers with an S-point DFT to obtain the frequency spread data comprising S frequency-domain symbols for the S subcarriers. In one design of block 1318, the UE may spread the S frequency-domain symbols with the orthogonal sequence of length L to obtain the output data comprising L sets of S output symbols for L symbol periods. Each set of S output symbols may be for a different data sequence and may be sent in one symbol period. The UE may spread across frequency first and then spread across time, as shown in FIG. 13. Alternatively, the UE may spread across time first and then spread across frequency.

In one design of block 1312, the UE may receive codewords for N HARQ processes in N downlink subframes and may determine an ACK value for each HARQ process. If one codeword is sent for each HARQ process, then the UE may set the ACK value for each HARQ process to a first value if an assignment is not received, a second value if the codeword is decoded correctly, or a third value if the codeword is decoded in error. If two codewords are sent for each HARQ process, then the UE may set the ACK value for each HARQ process to a first value if an assignment is not received, a second value if both codewords are decoded correctly, a third value if only the first codeword is decoded correctly, a fourth value if only the second codeword is decoded correctly, or a fifth value if both codewords are decoded in error. The UE may either individually or jointly code the N ACK values for the N HARQ processes to obtain ACK information. In one design, the UE may set the ACK value for each HARQ process to one of Q possible values and may jointly code the N ACK values for the N HARQ processes to obtain $N_{ACK}$ bits of ACK information, where $N_{ACK} = \lceil \log_2(Q^N) \rceil$. The UE may send the output data for the ACK information in one of M uplink subframes. The N downlink subframes and the M uplink subframes may be time division duplexed, e.g., as shown in FIGS. 2B and 3.

Figure 14:
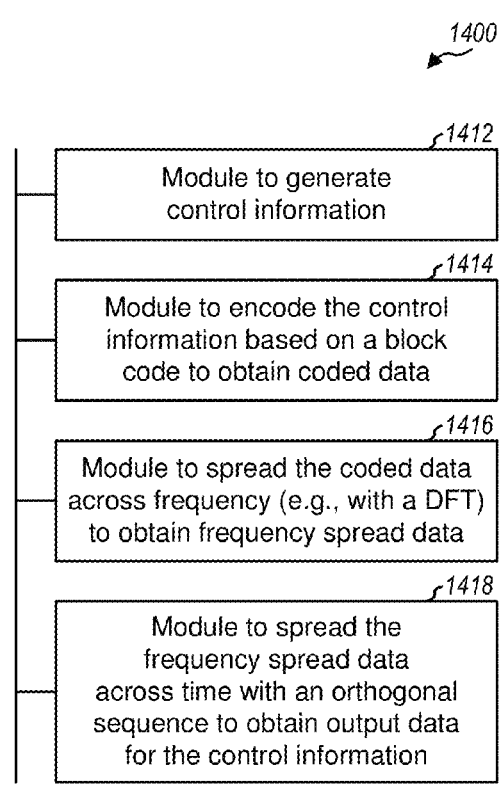
FIG. 14 shows an apparatus for sending control information.

FIG. 14 shows a design of an apparatus 1400 for sending control information in a wireless communication system. Apparatus 1400 includes a module 1412 to generate control information, a module 1414 to encode the control information based on a block code to obtain coded data, a module 1416 to spread the coded data across frequency with a DFT to obtain frequency spread data, and a module 1418 to spread the frequency spread data across time with an orthogonal sequence to obtain output data for the control information.

Figure 15:
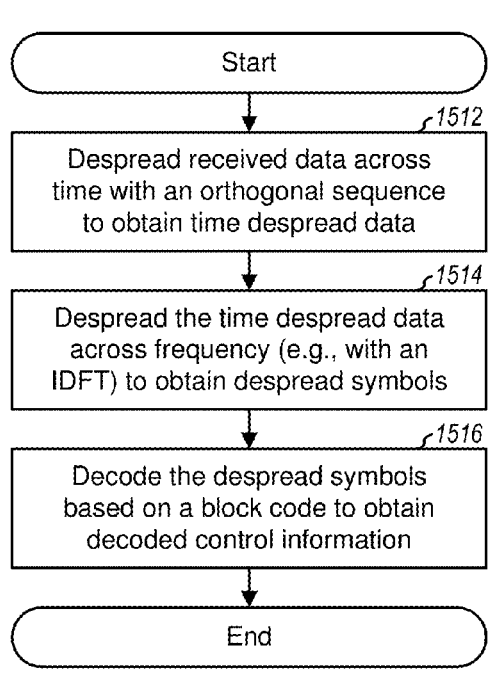
FIG. 15 shows a process for receiving control information.

FIG. 15 shows a design of a process 1500 for receiving control information in a wireless communication system. Process 1500 may be performed by a Node B (as described below) or by some other entity. The Node B may despread received data across time with an orthogonal sequence to obtain time despread data (block 1512). The Node B may despread the time despread data across frequency with an IDFT to obtain despread symbols for control information (block 1514). In one design, the Node B may despread the time despread data across S subcarriers with an S-point IDFT to obtain S despread symbols. The Node B may despread across time first and then despread across frequency, as shown in FIG. 15. Alternatively, the Node B may despread across frequency first and then despread across time. In any case, the Node B may decode the despread symbols based on a block code to obtain decoded control information, which may comprise ACK information, CQI information, etc. (block 1516).

In one design, the Node B may send codewords for N HARQ processes in N downlink subframes. The Node B may obtain the received data in one of M uplink subframes. The N downlink subframes and the M uplink subframes may be time division duplexed. The Node B may determine an ACK value for each HARQ processes based on the decoded control information.

Figure 16:
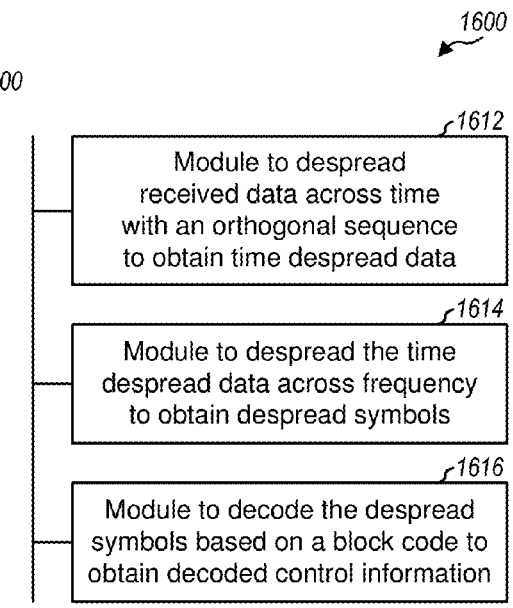
FIG. 16 shows an apparatus for receiving control information.

FIG. 16 shows a design of an apparatus 1600 for receiving control information in a wireless communication system. Apparatus 1600 includes a module 1612 to despread received data across time with an orthogonal sequence to obtain time despread data, a module 1614 to despread the time despread data across frequency with an IDFT to obtain despread symbols for control information, and a module 1616 to decode the despread symbols based on a block code to obtain decoded control information.

Figure 17:
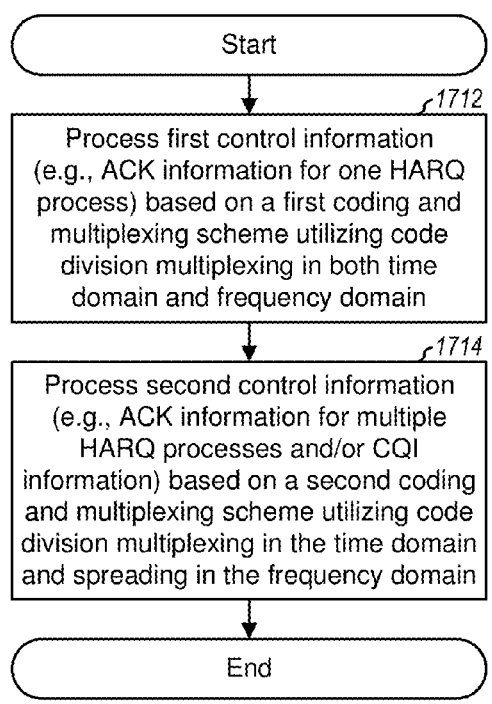
FIG. 17 shows a process for processing control information.

FIG. 17 shows a design of a process 1700 for processing control information in a wireless communication system. Process 1700 may be performed by a UE, a Node B, or some other entity. First control information may be processed based on a first coding and multiplexing scheme utilizing code division multiplexing in both time domain and frequency domain (block 1712). For the first coding and multiplexing scheme, the code division multiplexing in the time domain may be achieved by spreading across time with an orthogonal sequence, and the code division multiplexing in the frequency domain may be achieved with different cyclic shifts of a reference signal sequence. Second control information may be processed based on a second coding and multiplexing scheme utilizing code division multiplexing in the time domain and spreading in the frequency domain (block 1714). For the second coding and multiplexing scheme, the code division multiplexing in the time domain may be achieved by spreading across time with an orthogonal sequence, and the spreading in the frequency domain may be achieved with a DFT.

In one design of block 1712, the first control information may be processed by a transmitter (e.g., a UE) as shown in FIG. 9. The transmitter may generate a modulation symbol based on the first control information. The transmitter may modulate a reference signal sequence with the modulation symbol to obtain a modulated reference signal sequence. The transmitter may then spread the modulated reference signal sequence across time with an orthogonal sequence $w_m$.

In another design of block 1712, the first control information may be processed by a receiver (e.g., a Node B) as shown in FIG. 11. The receiver may despread received data across time with the orthogonal sequence $w_m$ to obtain time despread data. The receiver may correlate the time despread data with a reference signal sequence to obtain correlation results. The receiver may then recover the first control information based on the correlation results.

In one design of block 1714, the second control information may be processed by a transmitter as shown in FIG. 10. The transmitter may spread the second control information across frequency with a DFT to obtain frequency spread data. The transmitter may then spread the frequency spread data across time with an orthogonal sequence $w_m$.

In another design of block 1714, the second control information may be processed by a receiver as shown in FIG. 12. The receiver may despread received data across time with the orthogonal sequence $w_m$ to obtain time despread data. The receiver may further despread the time despread data across frequency with an IDFT to obtain frequency despread data. The receiver may then recover the second control information based on the frequency despread data.

In one design, the first control information may comprise ACK information for one HARQ process, and the second control information may comprise ACK information for multiple HARQ processes. In another design, the first control information may comprise ACK information, and the second control information may comprise only CQI information or both ACK and CQI information.

Figure 18:
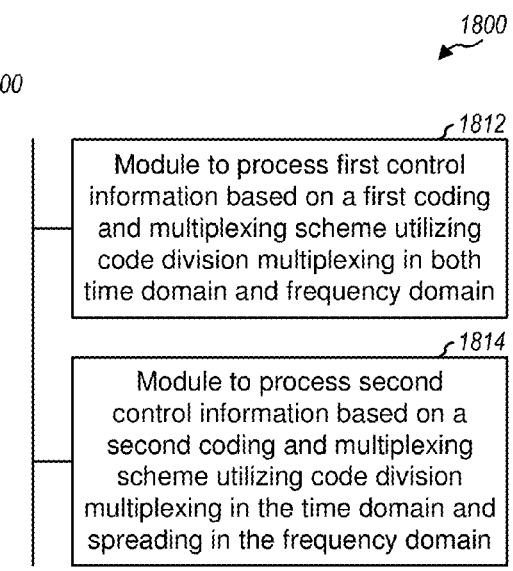
FIG. 18 shows an apparatus for processing control information.

FIG. 18 shows a design of an apparatus 1800 for processing control information in a wireless communication system. Apparatus 1800 includes a module 1812 to process first control information based on a first coding and multiplexing scheme utilizing code division multiplexing in both time domain and frequency domain, and a module 1814 to process second control information based on a second coding and multiplexing scheme utilizing code division multiplexing in the time domain and spreading in the frequency domain.

Figure 19:
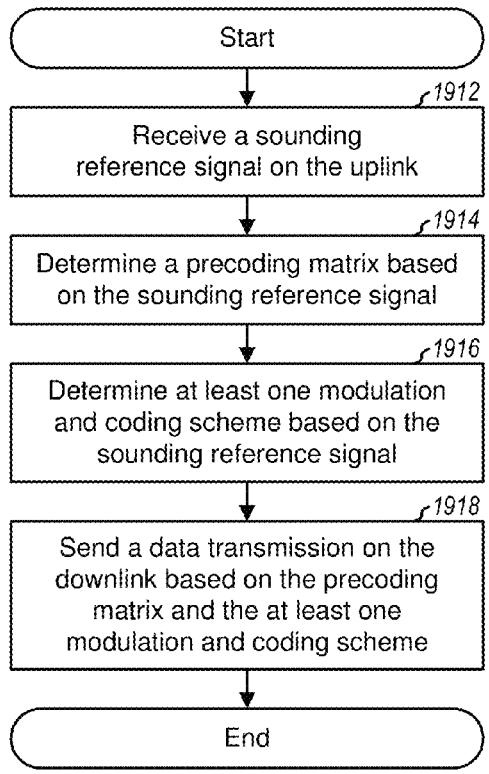
FIG. 19 shows a process for sending data in a TDD system.

FIG. 19 shows a design of a process 1900 for sending data in a wireless communication system utilizing TDD. Process 1900 may be performed by a Node B (as described below) or by some other entity. The Node B may receive a sounding reference signal on the uplink from a UE (block 1912). The Node B may determine a precoding matrix based on the sounding reference signal (block 1914). The Node B may also determine at least one modulation and coding scheme based on the sounding reference signal (block 1916). The Node B may then send a data transmission on the downlink based on the precoding matrix and the at least one modulation and coding scheme (block 1918).

In one design, the UE does not send CQI information to the Node B. The Node B may estimate noise and interference for the uplink based on the sounding reference signal. The Node B may assume symmetry for the noise and interference for the downlink and uplink. The Node B may then determine the at least one modulation and coding scheme based on the precoding matrix and the estimated noise and interference for the uplink.

In another design, the UE may send CQI information indicative of channel quality of the downlink to the Node B. The Node B may estimate noise and interference for the uplink based on the sounding reference signal. The Node B may determine asymmetry of the noise and interference for the downlink and uplink based on the CQI information and the estimated noise and interference for the uplink. The Node B may estimate noise and interference for the downlink based on the estimated noise and interference for the uplink and the asymmetry. The Node B may then determine the at least one modulation and coding scheme based on the precoding matrix and the estimated noise and interference for the downlink.

Figure 20:
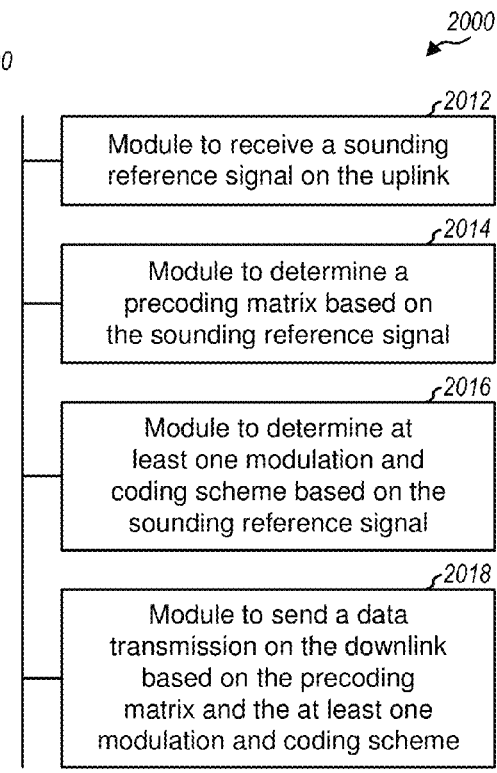
FIG. 20 shows an apparatus for sending data in a TDD system.

FIG. 20 shows a design of an apparatus 2000 for sending data in a wireless communication system utilizing TDD. Apparatus 2000 includes a module 2012 to receive a sounding reference signal on the uplink, a module 2014 to determine a precoding matrix based on the sounding reference signal, a module 2016 to determine at least one modulation and coding scheme based on the sounding reference signal, and a module 2018 to send a data transmission on downlink based on the precoding matrix and the at least one modulation and coding scheme.

Figure 21:
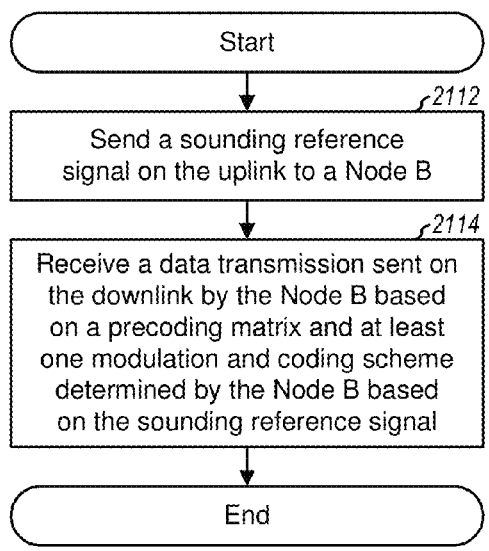
FIG. 21 shows a process for receiving data in a TDD system.

FIG. 21 shows a design of a process 2100 for receiving data in a wireless communication system utilizing TDD. Process 2100 may be performed by a UE (as described below) or by some other entity. The UE may send a sounding reference signal on the uplink to a Node B (block 2112). The UE may receive a data transmission sent on the downlink by the Node B based on a precoding matrix and at least one modulation and coding scheme determined by the Node B based on the sounding reference signal (block 2114).

In one design, the UE does not send CQI information indicative of channel quality of the downlink to the Node B. In another design, the UE may generate and send CQI information to the Node B. In this design, the Node B may determine asymmetry of noise and interference for the downlink and uplink based on the CQI information and the sounding reference signal. The Node B may then determine the at least one modulation and coding scheme based on the asymmetry.

Figure 22:
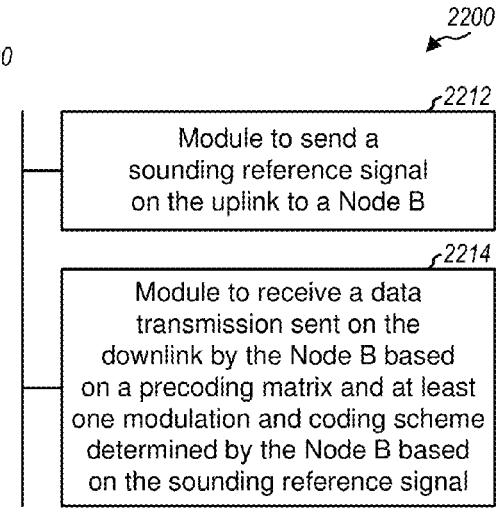
FIG. 22 shows an apparatus for receiving data in a TDD system.

FIG. 22 shows a design of an apparatus 2200 for receiving data in a wireless communication system utilizing TDD. Apparatus 2200 includes a module 2212 to send a sounding reference signal on the uplink to a Node B, and a module 2214 to receive a data transmission sent on the downlink by the Node B based on a precoding matrix and at least one modulation and coding scheme determined by the Node B based on the sounding reference signal.

The modules in FIGS. 14, 16, 18, 20 and 22 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending control information in a wireless communication system, comprising:
   determining an acknowledgement (ACK) value for each of N hybrid automatic repeat request (HARQ) processes, where N is greater than one, wherein the determining the ACK value for each HARQ process comprises setting the ACK value for each HARQ process to one of Q possible values, where Q is greater than one;
   generating ACK information based on N ACK values for the N HARQ processes, wherein the generating the ACK information comprises jointly coding the N ACK values to obtain $N_{ACK}$ bits for the ACK information, $N_{ACK}=\lceil \log_2(Q^N) \rceil$ and $\lceil \ \rceil$ denotes a ceiling operator;
   spreading control information across frequency with a discrete Fourier transform (DFT) to obtain frequency spread data, wherein the control information comprises the ACK information; and
   spreading the frequency spread data across time with an orthogonal sequence to obtain output data for the control information.

2. The method of claim 1, wherein the spreading the control information across frequency comprises spreading the control information across S subcarriers with an S-point DFT to obtain the frequency spread data comprising S frequency-domain symbols for the S subcarriers, where S is greater than one.

3. The method of claim 2, wherein the spreading the frequency spread data across time comprises spreading the S frequency-domain symbols with the orthogonal sequence of length L to obtain the output data comprising L sets of S output symbols for L symbol periods, where L is greater than one.

4. The method of claim 1, further comprising:
   encoding the control information based on a block code to obtain coded data, and wherein the spreading the control information across frequency comprises spreading the coded data across frequency to obtain the frequency spread data.

5. The method of claim 1, wherein the control information comprises acknowledgement (ACK) information and channel quality indicator (CQI) information, the method further comprising:
   jointly encoding the ACK information and the CQI information based on a block code to obtain coded data, and wherein the spreading the control information across frequency comprises spreading the coded data across frequency to obtain the frequency spread data.

6. The method of claim 1, wherein one codeword is sent for each of the N HARQ processes, and wherein the ACK value for each HARQ process is set to a first value if an assignment is not received, to a second value if the codeword is decoded correctly, or to a third value if the codeword is decoded in error.

7. The method of claim 1, wherein first and second codewords are sent for each of the N HARQ processes, and wherein the ACK value for each HARQ process is set to a first value if an assignment is not received, to a second value if the first and second codewords are decoded correctly, to a third value if only the first codeword is decoded correctly, to a fourth value if only the second codeword is decoded correctly, or to a fifth value if the first and second codewords are decoded in error.

8. The method of claim 1, further comprising:
   receiving codewords for the N HARQ processes in N downlink subframes; and
   sending the output data in one of M uplink subframes, wherein the N downlink subframes and the M uplink subframes are time division duplexed.

9. The method of claim 1, wherein the control information comprises acknowledgement (ACK) information, or channel quality indicator (CQI) information, or both ACK and CQI information.

10. An apparatus for wireless communication, comprising:
    at least one processor configured to:
    determine an acknowledgement (ACK) value for each of N hybrid automatic repeat request (HARQ) processes, where N is greater than one, wherein the determining the ACK value for each HARQ process comprises setting the ACK value for each HARQ process to one of Q possible values, where Q is greater than one;
    generate ACK information based on N ACK values for the N HARQ processes, wherein the generating the ACK information comprises jointly coding the N ACK values to obtain $N_{ACK}$ bits for the ACK information, $N_{ACK}=\lceil \log_2(Q^N) \rceil$ and $\lceil \ \rceil$ denotes a ceiling operator;
    spread control information across frequency with a discrete Fourier transform (DFT) to obtain frequency spread data, wherein the control information comprises the ACK information; and
    spread the frequency spread data across time with an orthogonal sequence to obtain output data for the control information.

11. The apparatus of claim 10, wherein the at least one processor is configured to spread the control information across S subcarriers with an S-point DFT to obtain the frequency spread data comprising S frequency-domain symbols for the S subcarriers, where S is greater than one.

12. The apparatus of claim 10, wherein the at least one processor is configured to receive codewords for the N HARQ processes in N downlink subframes, and to send the output data in one of M uplink subframes, wherein the N downlink subframes and the M uplink subframes are time division duplexed.

13. An apparatus for a wireless communication system, comprising:

means for determining an acknowledgement (ACK) value for each of N hybrid automatic repeat request (HARQ) processes, where N is greater than one, wherein the determining the ACK value for each HARQ process comprises setting the ACK value for each HARQ process to one of Q possible values, where Q is greater than one;

means for generating ACK information based on N ACK values for the N HARQ processes, wherein the generating the ACK information comprises jointly coding the N ACK values to obtain $N_{ACK}$ bits for the ACK information, $N_{ACK}=\lceil \log_2(Q^N) \rceil$ and $\lceil \ \rceil$ denotes a ceiling operator;

means for spreading control information across frequency with a discrete Fourier transform (DFT) to obtain frequency spread data, wherein the control information comprises the ACK information; and means for spreading the frequency spread data across time with an orthogonal sequence to obtain output data for the control information.

14. The apparatus of claim 13, wherein the means for spreading the control information across frequency comprises means for spreading the control information across S subcarriers with an S-point DFT to obtain the frequency spread data comprising S frequency-domain symbols for the S subcarriers, where S is greater than one.

15. A non-transitory computer-readable medium comprising:

code for determining an acknowledgement (ACK) value for each of N hybrid automatic repeat request (HARQ) processes, where N is greater than one, wherein the determining the ACK value for each HARQ process comprises setting the ACK value for each HARQ process to one of Q possible values, where Q is greater than one, and wherein the generating the ACK information comprises jointly coding the N ACK values to obtain $N_{ACK}$ bits for the ACK information, $N_{ACK}=\lceil \log_2(Q^N) \rceil$ and $\lceil \ \rceil$ denotes a ceiling operator;

code for generating ACK information based on N ACK values for the N HARQ processes;

code for causing at least one computer to spread control information across frequency with a discrete Fourier transform (DFT) to obtain frequency spread data, wherein the control information comprises the ACK information; and code for causing the at least one computer to spread the frequency spread data across time with an orthogonal sequence to obtain output data for the control information.

* * * * *